US008372512B2

(12) United States Patent
Hirai et al.

(10) Patent No.: US 8,372,512 B2
(45) Date of Patent: Feb. 12, 2013

(54) POLYLACTIC ACID-BASED RESIN FOAMED PARTICLES FOR IN-MOLD FOAM-MOLDING AND METHOD FOR PRODUCING THE SAME, AS WELL AS METHOD FOR PRODUCING POLYLACTIC ACID-BASED RESIN FOAM-MOLDED ARTICLE

(75) Inventors: Takaaki Hirai, Tenri (JP); Katsunori Nishijima, Nara (JP); Tetsuya Ochiai, Nara (JP)

(73) Assignee: Sekisui Plastics Co., Ltd., Osaka (JP)

( * ) Notice: Subject to any disclaimer, the term of this patent is extended or adjusted under 35 U.S.C. 154(b) by 573 days.

(21) Appl. No.: 12/593,293

(22) PCT Filed: Mar. 27, 2008

(86) PCT No.: PCT/JP2008/055915
§ 371 (c)(1),
(2), (4) Date: Sep. 27, 2009

(87) PCT Pub. No.: WO2008/123367
PCT Pub. Date: Oct. 16, 2008

(65) Prior Publication Data
US 2010/0136338 A1 Jun. 3, 2010

(30) Foreign Application Priority Data

Mar. 29, 2007 (JP) ................................ 2007-088074
Feb. 19, 2008 (JP) ................................ 2008-036852

(51) Int. Cl.
*B32B 5/16* (2006.01)
(52) U.S. Cl. .................. 428/402; 428/403; 428/405
(58) Field of Classification Search .................. 428/403, 428/402, 407
See application file for complete search history.

(56) References Cited

U.S. PATENT DOCUMENTS
2006/0167122 A1  7/2006  Haraguchi et al.

FOREIGN PATENT DOCUMENTS

| EP | 1 683 828 A2 | | 7/2006 |
|----|----|----|----|
| EP | 1683828 | * | 7/2006 |
| JP | 8-198992 A | | 8/1996 |
| JP | 2000-17038 A | | 1/2000 |
| JP | A200017038 | * | 1/2000 |
| JP | 2002-179832 A | | 6/2002 |
| JP | 2002-302567 A | | 10/2002 |
| JP | A2002302567 | * | 10/2002 |
| JP | 2003-73495 A | | 3/2003 |
| JP | 2003-301067 A | | 10/2003 |
| JP | 2004-277440 A | | 10/2004 |
| JP | 2005-264166 A | | 9/2005 |
| JP | 2007-100026 A | | 4/2007 |
| JP | 2007-169394 A | | 7/2007 |

OTHER PUBLICATIONS

International Search Report for the Application No. PCT/JP2008/055915 mailed Jun. 17, 2008.

* cited by examiner

*Primary Examiner* — Leszek Kiliman
(74) *Attorney, Agent, or Firm* — Cheng Law Group, PLLC

(57) ABSTRACT

The present invention provides a method for producing polylactic acid-based resin foamed particles for in-mold foam-molding from which a polylactic acid-based resin foam-molded article excellent in heat resistance and mechanical strength can be obtained by in-mold foam-molding. In the method of the present invention for producing polylactic acid-based resin foamed particles for in-mold foam-molding, a rotary blade is rotated at a given rotation speed while being always in contact with the front end surface of a nozzle and a polylactic acid-based resin extrudate extrusion-foamed through a nozzle is cut with the rotary blade, so that it is possible to cut the polylactic acid-based resin extrudate surely to obtain substantially spherical polylactic acid-based resin foamed particles. Therefore, when polylactic acid-based resin foamed particles are used for in-mold foam-molding, the polylactic acid-based resin foamed particles foam uniformly in all directions and, as a result, the foamed particles are thermal fusin bonded to unite together strongly in all direction.

2 Claims, 2 Drawing Sheets under particular conditions.

POLYLACTIC ACID-BASED RESIN FOAMED PARTICLES FOR IN-MOLD FOAM-MOLDING AND METHOD FOR PRODUCING THE SAME, AS WELL AS METHOD FOR PRODUCING POLYLACTIC ACID-BASED FOAM-MOLDED ARTICLE

TECHNICAL FIELD

The present invention relates to polylactic acid-based resin foamed particles for in-mold foam-molding, which may henceforth be referred to as "polylactic acid-based resin foamed particles", from which a polylactic acid-based resin foam-molded article excellent in heat resistance and mechanical strength can be obtained by in-mold foam-molding and to a method for producing the same, as well as to a method for producing a polylactic acid-based resin foam-molded article using polylactic acid-based resin foamed particles for in-mold foam-molding.

BACKGROUND ART

A polylactic acid-based resin is a resin obtained by polymerizing naturally occurring lactic acid and is a biodegradable resin which can be decomposed by naturally occurring microorganisms. Moreover, it is also excellent in mechanical properties at normal temperatures. It has therefore been attracting public attentions.

A polylactic acid-based resin has been produced generally by polymerizing D-lactic acid and/or L-lactic acid, or ring-opening polymerizing one or two or more lactides selected from the group consisting of L-lactide, D-lactide and DL-lactide.

A polylactic acid-based resin to be obtained varies in physical properties, especially crystallinity, depending upon the content of the D-form component or the L-form component contained in the polylactic acid-based resin. Specifically, the crystallinity of a polylactic acid-based resin to be obtained decreases as the content of the less optical isomer of the D-form component or the L-form component contained in the polylactic acid-based resin increases, and eventually the resin will become amorphous.

As a method for producing a polylactic acid-based resin foam-molded article by causing polylactic acid-based resin foamed particles to foam, in-mold foam-molding has been proposed. The above-mentioned in-mold foam-molding is a method for producing a polylactic acid-based resin foam-molded article having a desired shape in which polylactic acid-based resin foamed particles are filled into a mold, and the polylactic acid-based resin foamed particles are heated with a heat medium, such as hot water or steam, to foam them, and the foamed particles are fusion-bonded to unite together by the foam pressure of the polylactic acid-based resin foamed particles.

Specifically patent document 1 discloses a resin composition prepared by aging under given conditions the resin composition obtained by incorporating a polyisocyanate compound having an isocyanate group of $\geq 2$ equivalents/mol into a polylactic acid having an L-form to D-form molar ratio of from 95/5 to 60/40 or from 40/60 to 5/95, in an amount of 0.5 to 5% by weight based on the polylactic acid, and causing them to react. In addition, it discloses that particles are produced from the aforementioned resin composition, the particles are impregnated with a foaming agent and a foaming aid, the resulting foamable particles are preliminarily foamed to produce preliminarily foamed particles, and the preliminarily foamed particles are filled into a mold and then are foamed to form a molded article with a desired shape.

However, the polylactic acid-based resin constituting the resin composition has a molar ratio of the optical isomer component of the L-form or the D-form, whichever is less, of 5 mol % or more, and the polylactic acid-based resin is low in crystallinity or amorphous and is poor in heat resistance. Therefore, a molded article obtained from this resin composition has insufficient heat resistance, i.e., about 50° C. at most, which has caused problems in practical use.

In the above method, it is considered to use, as the polylactic acid-based resin for constituting the resin composition, a highly crystalline polylactic acid-based resin in which the molar ratio of the less optical isomer of the L-form or the D-form is 5 mol % or less. However, since particles of the above resin composition are impregnated with a foaming agent to form foamable particles and the foamable particles are preliminarily foamed by being heated, crystallization of the polylactic acid-based resin proceeds due to the heat added during the preliminary foaming process. As a result, the preliminarily foamed particles obtained become preliminarily foamed particles with high crystallinity degree, so that the fusion bonding property thereof deteriorates. Therefore, there has been a problem with a molded article obtained using such preliminarily foamed particles that the article is low in mechanical strength due to its low fusion bonding property.

Moreover, although preliminarily foamed particles containing relatively fine cells can be obtained by the above-mentioned method, this method has a problem that the productivity is low because it requires a step of producing particles from a resin composition, and a step of impregnating the particles with a foaming agent and a foaming aid, followed by preliminarily foaming the resulting foamable particles.

Furthermore, patent document 2 discloses a method for continuously producing biodegradable polyester-based resin preliminarily foamed particles wherein in producing preliminarily foamed particles for in-mold molding from a biodegradable polyester-based resin, the biodegradable polyester-based resin and a foaming agent are kneaded with an extruder and extruded in the form of a foamed strand, and the foamed strand is cut to obtain preliminarily foamed particles. It also discloses that as a method for cutting the foamed strand, so-called hot cutting system, in which a strand under foaming is cut while being cooled is preferred (paragraph [0030]).

In the above-mentioned continuous production method, however, since a strand is cut at its portion which has already foamed as described in paragraph [0030], there is a fear that a cut section of the strand may fall into a condition that cut sections of cells are exposed. As a result, the resulting preliminarily foamed particles have had a problem that foaming gas is apt to escape from the cut sections of cells exposed on their surfaces and therefore they are low in foaming property.

Furthermore, preliminarily foamed particles obtained by cutting a strand have another problem that the crystallinity degree of the polyester-based resin constituting the preliminarily foamed particles has increased because they have not been cooled forcibly, and, as a result, the thermal fusion bonding property will be deteriorated.

Patent document 3 discloses a method for producing foamable polylactic acid particles by which foamed particles excellent in moldability and thermal fusion bonding property can be obtained. This production method is a method in which resin particles having a calorific value in differential scanning calorimetry of 15 J/g or more are impregnated with carbon dioxide under particular conditions.

However, since the calorific value in differential scanning calorimetry is 15 J/g or more, the polylactic acid resin is low in crystallinity and is insufficient in heat resistance, i.e., having a heat resisting temperature of about 80° C.

Moreover, since the gas pressure applied when resin particles are impregnated with carbon dioxide is 0.5 to 10 MPa, there has been arisen a problem that crystallization of the polylactic acid proceeds during the impregnation of the resin particles with carbon dioxide, so that the thermal fusion bonding property of the resulting foamable polylactic acid particles is deteriorated and that foamable polylactic acid particles become flat, so that the foaming property thereof will be deteriorated.

Patent document 1: JP-A 2000-17038
Patent document 2: JP-A 2002-302567
Patent document 3: JP-A 2003-73495

DISCLOSURE OF THE INVENTION

Problems to be Solved by the Invention

The present invention provides polylactic acid-based resin foamed particles for in-mold foam-molding from which a polylactic acid-based resin foam-molded article having good appearance and being excellent in heat resistance and mechanical strength can be obtained by in-mold foam-molding, and a method for producing the same, as well as a method for producing a polylactic acid-based resin foam-molded article using the aforementioned polylactic acid-based resin foamed particles for in-mold foam-molding.

Means for Solving the Problem

The method for producing polylactic acid-based resin foamed particles for in-mold foam-molding includes a step of feeding a polylactic acid-based resin which contains both optical isomers, a D-form and an L-form, as constituent monomer components, and the content of one of the optical isomers, the D-form or the L-form, whichever is less, being less than 5 mol, or contains only one of optical isomers, a D-form or an L-form, as a constituent monomer component, into an extruder and melt-kneading the polylactic acid-based resin in the presence of a foaming agent, a step of extruding the polylactic acid-based resin extrudate through a nozzle die attached to the front end of the extruder, cutting the polylactic acid-based resin extrudate with a rotary blade rotating at a rotation rate of 2000 to 10000 rpm in contact with the front end surface of the nozzle die while allowing the polylactic acid-based resin extrudate to foam to produce polylactic acid-based resin foamed particles, and scattering the polylactic acid-based resin foamed particles by cutting stress, and a step of causing the polylactic acid-based resin foamed particles to collide against a cooling member provided forward of the nozzle die to cool.

First, a producing apparatus is described which is used for the production of polylactic acid-based resin foamed particles. In FIG. 1, 1 denotes a nozzle die attached to the front end of an extruder. This nozzle die is preferable because it can form uniform fine cells through extrusion-foaming of a polylactic acid-based resin. Moreover, a plurality of outlets 11, 11, . . . of nozzles are formed at equal distances on an imaginary circle A in a front end surface 1a of a nozzle die 2 as illustrated in FIG. 2. The nozzle die which is attached to the front end of the extruder is not particularly restricted unless a polylactic acid-based resin foams in the nozzle.

The number of the nozzles of the nozzle die 1 is preferably 2 to 80, more preferably 5 to 60, and particularly preferably 8 to 50 because if the number is excessively small, the production efficiency of polylactic acid-based resin foamed particles decreases, whereas if it is excessively large, polylactic acid-based resin extrudates which are extrusion-foamed through adjacent nozzles may come into contact with each other to unite together or polylactic acid-based resin foamed particles obtained by cutting the polylactic acid-based resin extrudates may be unite together.

The diameter of the outlet 11 of a nozzle in the nozzle die 1 is preferably 0.2 to 2 mm, more preferably 0.3 to 1.6 mm, and particularly preferably 0.4 to 1.2 mm because if it is excessively small, the extrusion pressure may become excessively high and, as a result, it may become difficult to perform extrusion-foaming, whereas if it is excessively large, polylactic acid-based resin foamed particles come to have a large diameter and, as a result, come to have a reduced filling property into a mold.

The shear rate of a polylactic acid-based resin at the outlet 11 of a nozzle in the nozzle die 1 is preferably 1000 to 30000 $\sec^{-1}$, more preferably 2000 to 25000 $\sec^{-1}$, and particularly preferably 3000 to 20000 $\sec^{-1}$ because if it is extremely small, the expansion ratio of polylactic acid-based resin foamed particles may decrease or polylactic acid-based resin foamed particles may have coarse cells, whereas if it is excessively large, fracture may occur and, as a result, it may be impossible to perform extrusion-foaming stably.

The shear rate at the outlet 11 of a nozzle of the nozzle die refers to one calculated based on the following formula:

$$\text{Shear rate (sec}^{-1}) = 4 \times Q/(\pi r^3)$$

It is noted that Q is a volume extrusion rate ($cm^3$/sec) of a polylactic acid-based resin, provided that when Q is calculated from a mass extrusion rate (g/sec), the density of the polylactic acid-based resin is set to be 1.0 $g/cm^3$, and r is the radius (cm) of the nozzle.

In order to reduce fracture, the length of a land portion of the nozzle die 1 is preferably 4 to 30 times as large as the diameter of the outlet 11 of a nozzle of the nozzle die 1, and more preferably 5 to 20 times as large as the diameter of the outlet 11 of a nozzle of the nozzle die 1. This is because if the length of the land portion of a nozzle die is smaller in comparison to the diameter of the outlet of a nozzle of the nozzle die, fracture may occur and, as a result, it may be impossible to perform extrusion-foaming stably, whereas if the length of the land portion of a nozzle die is larger in comparison to the diameter of the outlet of a nozzle of the nozzle die, an excessively high pressure may be applied to the nozzle die and, as a result, it may be impossible to perform extrusion-foaming.

In the region surrounded by the outlets 11, 11 . . . in the front end surface 1a of the nozzle die 1 is provided with a rotary shaft 2 while projecting forward, and the rotary shaft 2 penetrates a front portion 41a of a cooling drum 41 constituting a cooling member 4, described later, and is connected to a driving member 3, such as a motor.

Furthermore, one or a plurality of rotary blades 5, 5 . . . are provided integrally on the outer peripheral surface of the rear end portion of the rotary shaft 2, and all the rotary blades 5 fall, when rotate, into a state where they are always in contact with the front end surface 1a of the nozzle die 1. When a plurality of the rotary blades 5, 5 . . . are provided integrally on the rotary shaft 2, a plurality of the rotary blades 5, 5 . . . are arranged at equal distances along the circumferential direction of the rotary shaft 2. In FIG. 2 is illustrated as one example a case where four rotary blades 5, 5 . . . are provided integrally on the peripheral surface of the rotary shaft 2.

It is configured so that the rotary blades 5, 5 . . . can move on an imaginary circle A on which outlets 11, 11 . . . of nozzles are formed while being always in contact with the front end surface 1a of the nozzle die 1 and polylactic acid-based resin extrudates extruded through the outlets 11, 11 . . . of the nozzles can be cut successively and continuously.

Moreover, a cooling member 4 is provided so that at least the front end portion of the nozzle die 1 and the rotary shaft 2 will be surrounded thereby. This cooling member 4 has a cylindrical bottomed cooling drum 41 that has a front portion 41a with a circular shape larger in diameter than the nozzle die 1 and a cylindrical peripheral wall portion 41b which extends backward from the peripheral edge of the front portion 41a.

While examples of the material which forms the cooling member 4 include metals, synthetic resins and woods, metals are preferable in view of processability, durability and dimensional accuracy. Among metals, iron and aluminum are more preferable in view of processability and performance.

Furthermore, in a part in the peripheral wall portion 41b of the cooling drum 41 which corresponds to the outside of the nozzle die 1, a feeding port 41c for feeding a cooling liquid 42 is formed so that it may penetrate between the inner peripheral surface and the outer peripheral surface. To the outer opening portion of the feeding port 41c of the cooling drum 41 is connected a feeding pipe 41d for feeding the cooling liquid 42 into the cooling drum 41.

The apparatus is configured so that the cooling liquid 42 can be fed through the feeding pipe 41d obliquely forward along the inner peripheral surface of the peripheral wall portion 41b of the cooling drum 41. The cooling liquid 42 runs forward spirally along the inner peripheral surface of the peripheral wall portion 41b of the cooling drum 41 by a centrifugal force accompanying the flow rate at the time of feeding the liquid into the inner peripheral surface of the peripheral wall portion 41b of the cooling drum 41 through the feeding pipe 41d. Moreover, the apparatus is configured so that the cooling liquid 42 may spread gradually in the direction perpendicular to the running direction during its running along the inner peripheral surface of the peripheral wall portion 41b and, as a result, the inner peripheral surface of the peripheral wall portion 41b extending forward from the feeding port 41c of the cooling drum 41 can be covered entirely with the cooling liquid 42.

The cooling liquid 42 is not particularly restricted as long as it can cool polylactic acid-based resin foamed particles and examples thereof include water and alcohol. In view of treatment after use, water is preferred.

On the under surface of the front end portion of the peripheral wall portion 41b of the cooling drum 41 is formed a discharging port 41e while penetrating between the inner peripheral surface and the outer peripheral surface, and a discharging pipe 41f is connected to the outer opening portion of the discharging port 41e so that polylactic acid-based resin foamed particles and the cooling liquid 42 can be discharged continuously.

Next, the polylactic acid-based resin to be used in the present invention will be described. As to the polylactic acid-based resin to be used in the present invention, a commercially available polylactic acid-based resin can be used, and specifically, it can be obtained by copolymerizing D-lactic acid and L-lactic acid as monomers, or polymerizing either one of D-lactic acid and L-lactic acid as a monomer, or ring-opening polymerizing one or two or more lactides selected from the group consisting of D-lactide, L-lactide and DL-lactide. Any polylactic acid-based resin may be used.

In the preparation of a polylactic acid-based resin, in a case where a D-form and an L-form are used together as monomers, when the proportion of one of the optical isomers, the D-form or the L-form, whichever is less, is less than 5 mol %, or when any one of optical isomer, a D-form or an L-form, is used as a monomer, that is, when the polylactic acid-based resin contains both optical isomers, a D-form and an L-form, as constituent monomer components thereof, and the content of one of the optical isomers, the D-form or the L-form, whichever is less, is less than 5 mol %, or when the polylactic acid-based resin contains only one optical isomer, a D-form or an L-form, as a constituent monomer component, the resulting polylactic acid-based resin comes to have a high crystallinity and, as a result, comes to have a high melting point. On the other hand, when a D-form and an L-form are used together as monomers, wherein the proportion of the D-form or the L-form, whichever is less, is 5 mol % or more, the crystallinity of the resulting polylactic acid-based resin lowers and the resin will eventually become amorphous as the less optical isomer increases.

Therefore, in the present invention is used a polylactic acid-based resin which contains both optical isomers, a D-form and an L-form, as constituent monomer components, and the content of one of the optical isomers, the D-form or the L-form, whichever is less, being less than 5 mol %, or a polylactic acid-based resin which contains only one optical isomer, a D-form or an L-form, as a constituent monomer component. Use of such a polylactic acid-based resin can make resulting polylactic acid-based resin foamed particles have high heat resistance.

Moreover, as the polylactic acid-based resin obtained by using a D-form and an L-form together as monomers for polymerization, a polylactic acid-based resin obtained by polymerizing monomers having a proportion of the optical isomer, the D-form or the L-form, whichever is less, of less than 4 mol % is preferable, a polylactic acid-based resin obtained by polymerizing monomers having a proportion of the optical isomer, the D-form or the L-form, whichever is less, of less than 3 mol % is more preferable, and a polylactic acid-based resin obtained by polymerizing monomers having a proportion of the optical isomer, the D-form or the L-form, whichever is less, of less than 2 mol % is particularly preferable.

That is, a polylactic acid-based resin which contains both optical isomers, a D-form and an L-form, as constituent monomer components, and the content of one of the optical isomers, the D-form or the L-form, whichever is less, being less than 4 mol % is preferable, a polylactic acid-based resin which contains both optical isomers, a D-form and an L-form, as constituent monomer components, and the content of one of the optical isomers, the D-form or the L-form, whichever is less, being less than 3 mol % is more preferable, and a polylactic acid-based resin which contains both optical isomers, a D-form and an L-form, as constituent monomer components, and the content of one of the optical isomers, the D-form or the L-form, whichever is less, being less than 2 mol % is more preferable.

As to a polylactic acid-based resin containing a D-form and an L-form as constituent monomer components, the smaller the proportion of the optical isomer, the D-form or the L-form, whichever is less, becomes smaller, the higher the melting point as well as the crystallinity of the polylactic acid-based resin becomes. Therefore, the heat resistance of a foam-molded article obtained by filling foamed particles into a mold and foaming them also increases and it is possible that the foam-molded article can maintain its shape even at high temperatures. It, therefore, becomes possible to take out a foam-molded article still at a high temperature from a mold, which leads to reduction in a cooling time of a foam-molded article in a mold and can also increase the efficiency of foam-molded article production.

The content of a D-form or an L-form in a polylactic acid-based resin can be measured by the following method. The polylactic acid-based resin is freeze-pulverized and 200 mg of a powder of the polylactic acid-based resin is fed into an Erlenmeyer flask. Then, 30 ml of a 1N aqueous solution of sodium hydroxide is added to the Erlenmeyer flask. The polylactic acid-based resin is dissolved completely by heating at 65° C. while shaking the Erlenmeyer flask. Then, a 1N hydrochloric acid is supplied to the Erlenmeyer flask to neutralize and thereby a decomposition solution with a pH of 4 to 7 is prepared, followed by adjustment to a given volume using a measuring flask.

Next, the decomposition solution is passed through a 0.45 μm membrane filter, followed by analysis by the use of liquid chromatograph. Based on the resulting chart, the amounts of the D-form and the L-form are calculated by using the area ratio determined from the areas of the peaks derived from the D-form and the L-form as a presence ratio. A procedure the same as that described above is repeated five times, and the amounts of the resulting D-form and the L-form are arithmetically averaged, respectively, and the results are used as the amounts of the D-form and the L-form of the polylactic acid-based resin, respectively.

HPLC instrument (liquid chromatograph): Commercial name "PU-2085 Plus type system" manufactured by Jasco Corporation Column: Commercial name "SUMICHIRAL OA5000" (4.6 mmϕ×250 mm) manufactured by Sumika Chemical Analysis Service, Ltd.

Column temperature: 25° C.

Mobile phase: Mixed solution of 2 mM aqueous solution of $CuSO_4$ and 2-propanol (Aqueous solution of $CuSO_4$: 2-propanol (volume ratio)=95:5)

Mobile phase flow rate: 1.0 ml/min

Detector: UV 254 nm

Injection amount: 20 microliters

Polylactic acid-based resin foamed particles are produced by extrusion-foaming. Accordingly, a polylactic acid-based resin constituting the polylactic acid-based resin formed particles is preferably adjusted so that the melting point (mp) of the polylactic acid-based resin and the temperature T at an intersection of a storage modulus curve and a loss modulus curve obtained by a dynamic viscoelasticity measurement, will satisfy the following formula 1:

(Melting point (mp) of the polylactic acid-based resin−40° C.)≦(temperature T at the intersection)≦Melting point (mp) of the polylactic acid-based resin    Formula 1

Here, the storage modulus obtained by a dynamic viscoelasticity measurement is an index which represents an elastic property among viscoelasticities and is an index which represents the magnitude of the elasticity of a cell film in a foaming process. It is an index which represents the magnitude of foam pressure necessary for expanding against the shrinking force of a cell film in a foaming process.

That is, if the storage modulus obtained by the dynamic viscoelasticity measurement of a polylactic acid-based resin is low, a force with which a cell film tries to shrink against an elongation force is small when the cell film is elongated, and a foaming film is elongated easily due to foam pressure needed for the production of polylactic acid-based resin foamed particles, and as a result, the cell film is elongated excessively, resulting in occurrence of cell breakage. On the other hand, if the storage modulus obtained by the dynamic viscoelasticity measurement of a polylactic acid-based resin is high, a shrinking force of the cell film against elongation is large when an elongation force is applied to the cell film, and even if cells have expanded once due to the foam pressure needed for the production of polylactic acid-based resin foamed particles, cells shrink as the foam pressure decreases with time due to temperature reduction or the like.

Moreover, the loss modulus obtained by the dynamic viscoelasticity measurement is an index which represents a viscosity-like property among viscoelasticities and represents the viscosity of a cell film in a foaming process. It is an index which represents a tolerant range within which the cell film can be elongated without breaking and which also represents the ability of a cell having been expanded to a desired size by the action of foam pressure to maintain itself at the expanded cell size.

That is, if the loss modulus obtained by the dynamic viscoelasticity measurement of a polylactic acid-based resin is low, a cell film breaks easily when the cell film is elongated by the foam pressure needed for the production of polylactic acid-based resin foamed particles. On the other hand, if the loss modulus obtained by the dynamic viscoelasticity measurement of a polylactic acid-based resin is high, foaming force is converted into thermal energy by the cell film and, as a result, it becomes difficult to elongate the cell film smoothly during the production of polylactic acid-based resin foamed particles and it becomes difficult to expand cells.

Thus, in producing polylactic acid-based resin foamed particles by foaming a polylactic acid-based resin, the polylactic acid-based resin is required to have an elastic force for elongating moderately without causing breakage of cell films due to foam pressure necessary for obtaining polylactic acid-based resin foamed particles, that is, the storage modulus, and it preferably has a viscous force for smoothly elongating without breaking cell films due to the foaming force and for maintaining cells having expanded to a desired size at the size regardless of decrease of foam pressure with time, that is, the loss modulus.

In other words, it is preferable that a polylactic acid-based resin has values suitable for extrusion-foaming with respect to both the storage modulus and the loss modulus in an extrusion-foaming step. By adjusting the temperature T at an intersection of a storage modulus curve and a loss modulus curve both obtained by a dynamic viscoelasticity measurement of a polylactic acid-based resin (the temperature may be referred to as a "temperature T at an intersection of a storage modulus curve and a loss modulus curve") and the melting point (mp) of the polylactic acid-based resin so that they may satisfy the following formula 1, preferably formula 2, in order to impart the storage modulus and the loss modulus suitable for extrusion-foaming to the polylactic acid-based resin in an extrusion-foaming step, it is possible to render the storage modulus and the loss modulus of the polylactic acid-based resin suitable for extrusion-foaming and thereby make the extrusion-foaming property of the polylactic acid-based resin good while balancing the moduli and it is possible to produce polylactic acid-based resin foamed particles stably.

[Melting point (mp) of the polylactic acid-based resin−40° C.]≦Temperature T at the intersection≦Melting point (mp) of the polylactic acid-based resin    Formula 1

[Melting point (mp) of the polylactic acid-based resin−35° C.]≦Temperature T at the intersection≦[Melting point (mp) of the polylactic acid-based resin−10° C.]    Formula 2

The reason why it is preferable to make an adjustment so that the temperature T at an intersection of a storage modulus curve and a loss modulus curve both obtained by a dynamic viscoelasticity measurement of a polylactic acid-based resin and the melting point (mp) of the polylactic acid-based resin may satisfy the foregoing formula 1 is described in detail below.

First, if the temperature T at an intersection of a storage modulus curve and a loss modulus curve both obtained by a dynamic viscoelasticity measurement of a polylactic acid-based resin is more than 40° C. lower than the melting point (mp) of the polylactic acid-based resin, the balance of the loss modulus and the storage modulus is lost because the loss modulus of the polylactic acid-based resin at the time of extrusion-foaming is excessively large in comparison with the storage modulus.

Then, if a foaming force suitable to the loss modulus of a polylactic acid-based resin, i.e., a foaming force in conformity with the viscosity of the polylactic acid-based resin, is used, the foaming force is so large for the elastic force of the polylactic acid-based resin that cell films break and cell breakage occurs and, as a result, good polylactic acid-based resin foamed particles cannot be obtained. Conversely, if a foaming force suitable to the storage modulus of a polylactic acid-based resin, i.e., a foaming force in conformity with the elasticity of the polylactic acid-based resin, is used, the foaming force is small for the viscous force of the polylactic acid-based resin and the polylactic acid-based resin is hard to foam and, as a result, it becomes difficult to obtain good polylactic acid-based resin foamed particles.

If the temperature T at an intersection of a storage modulus curve and a loss modulus curve both obtained by a dynamic viscoelasticity measurement of a polylactic acid-based resin is higher than the melting point (mp) of the polylactic acid-based resin, the balance of the loss modulus and the storage modulus is lost similarly to the above description because the storage modulus of the polylactic acid-based resin at the time of extrusion-foaming is excessively large in comparison with the loss modulus.

Then, if a foaming force suitable to the storage modulus of a polylactic acid-based resin, i.e., a foaming force in conformity with the elasticity of the polylactic acid-based resin, is used, the foaming force is so large for the viscous force of the polylactic acid-based resin that cell films break and cell breakage occurs and, as a result, good polylactic acid-based resin foamed particles cannot be obtained. Conversely, if a foaming force suitable to the loss modulus of a polylactic acid-based resin, i.e., a foaming force in conformity with the viscosity of the polylactic acid-based resin, is used, the foaming force is small for the elastic force of the polylactic acid-based resin and even if the polylactic acid-based resin is foamed once due to the foaming force, cells will shrink as the foaming force decreases with time and, as a result, it becomes difficult to obtain good polylactic acid-based resin foamed particles.

Examples of the method for making an adjustment so that the temperature T at an intersection of a storage modulus curve and a loss modulus curve both obtained by a dynamic viscoelasticity measurement of a polylactic acid-based resin and the melting point (mp) of the polylactic acid-based resin may satisfy the foregoing formula 1 include a method in which the weight average molecular weight of a polylactic acid-based resin to be obtained is adjusted by adjusting a reaction time or a reaction temperature in the polymerization to a polylactic acid-based resin because the temperature T at an intersection of a storage modulus curve and a loss modulus curve both obtained by a dynamic viscoelasticity measurement of a polylactic acid-based resin becomes higher as the weight average molecular weight of the polylactic acid-based resin increases, and a method in which the weight average molecular weight of a polylactic acid-based resin is adjusted by the use of a thickener or a crosslinking agent before or during extrusion-foaming.

Here, the melting point (mp) of a polylactic acid-based resin is one measured by the following procedure. That is, a differential scan calorimetric analysis of a polylactic acid-based resin is conducted in accordance with JIS K7121:1987, and a temperature of a fusion peak in the resulting DSC curve is set to be the melting point (mp) of the polylactic acid-based resin. It is noted that if there are a plurality of temperatures of fusion peaks, the highest temperature is used.

The temperature T at an intersection of a storage modulus curve and a loss modulus curve both obtained by a dynamic viscoelasticity measurement of a polylactic acid-based resin is one measured by the following procedure. First, polylactic acid-based resin foamed particles are obtained in the same procedure as that for producing polylactic acid-based resin particles except for adding no foaming agent.

The polylactic acid-based resin particles are dried over 3 hours at 80° C. under a reduced pressure of $9.33 \times 10^4$ Pa. The polylactic acid-based resin particles are put on a measuring plate heated at a temperature which is 40 to 50° C. higher than the melting point of the polylactic acid-based resin constituting the polylactic acid-based resin particles and they are left over 5 minutes under a nitrogen atmosphere to be molten.

Next, a plane circular press plate of 25 mm in diameter is prepared, and using this press plate, the polylactic acid-based resin on the measuring plate is pressed vertically until the distance between the opposing surfaces of the press plate and the measuring plate becomes 1 mm. After removal of the polylactic acid-based resin which has squeezed out from the periphery of the press plate, the sample is left over 5 minutes.

Then, a dynamic viscoelasticity measurement of the polylactic acid-based resin is performed under conditions including a strain of 5%, a frequency of 1 rad/sec, a temperature reduction rate of 2° C./min, and a measurement interval of 30 seconds, whereby the storage modulus and the loss modulus are measured. Next, a storage modulus curve and a loss modulus curve are drawn while the temperature is the abscissa and the storage modulus and the loss modulus are each the ordinate. In drawing the storage modulus curve and the loss modulus curve, measured values adjacent to each other based on the measurement temperature are connected by a straight line.

The temperature T at an intersection of a storage modulus curve and a loss modulus curve can be obtained by being read from the aforementioned graphs. It is noted that when the storage modulus curve and the loss modulus curve intersect at a plurality of points, the highest temperature among the intersections of the storage modulus curve and the loss modulus curve is set to be the "temperature T at an intersection of a storage modulus curve and a loss modulus curve."

The temperature T at an intersection of a storage modulus curve and a loss modulus curve both obtained by a dynamic viscoelasticity measurement can be measured using a dynamic viscoelasticity measuring device commercially available under the commercial name "DynAlyser DAR-100" from the Reologica Instruments A.B.

The aforementioned polylactic acid-based resin is fed to an extruder and melt-kneaded in the presence of a foaming agent, and then a polylactic acid-based resin extrudate is extrusion-foamed through the nozzle die 1 attached to the front end of the extruder.

The aforementioned extruder is not particularly restricted if it is an extruder having conventionally been used and examples thereof include a single screw extruder, a twin screw extruder and a tandem extruder composed of a plurality of extruders linked together.

As the foaming agent, one which has conventionally been used is used and examples thereof include chemical foaming agents, such as azodicarbonamide, dinitrosopentamethylenetetramine, hydrazoyldicarbonamide and sodium bicarbonate; and physical foaming agents, e.g., saturated aliphatic hydrocarbons, such as propane, n-butane, isobutane, n-pentane, isopentane and hexane, ethers, such as dimethyl ether, methyl chloride, chlorofluocarbons, such as 1,1,1,2-tetrafluoroethane, 1,1-difluoroethane and monochlorodifluoromethane, carbon dioxide and nitrogen. Dimethyl ether, propane, n-butane, isobutane and carbon dioxide are preferable, propane, n-butane and isobutane are more preferable, and n-butane and isobutane are particularly preferable.

As to the amount of the foaming agent fed into the extruder, if it is excessively small, it may be impossible to foam polylactic acid-based resin foamed particles to a desired expansion ratio, whereas if it is excessively large, since the foaming agent acts as a plasticizer, it may be impossible to obtain good polylactic acid-based resin foamed particles because of decrease in the viscoelasticity of a polylactic acid-based resin in a molten state and resultant decrease in foaming property, or it may become impossible to control the crystallinity degree due to an excessively high expansion ratio of polylactic acid-based resin foamed particles. It is therefore preferably from 0.1 to 5 parts by weight, more preferably from 0.2 to 4 parts by weight, and particularly preferably from 0.3 to 3 parts by weight based on 100 parts by weight of the polylactic acid-based resin.

While a cell regulator is preferably added to the extruder, because most cell regulators act as a nucleating agent for polylactic acid-based resin foamed particles, it is preferable to use a cell regulator which fails to promote the crystallization of a polylactic acid-based resin. As such a cell regulator, a polytetrafluoroethylene powder and a polytetrafluoroethylene powder modified with an acrylic resin are preferred.

As to the amount of the cell regulator fed into the extruder, if it is excessively small, cells in polylactic acid-based resin become coarse, so that the appearance of the resulting polylactic acid-based resin foam-molded article may be deteriorated, whereas if it is excessively large, the closed cell ratio of the polylactic acid-based resin foamed particles may decrease due to the occurrence of cell breakage during the extrusion-foaming of a polylactic acid-based resin. It is therefore preferably from 0.01 to 3 parts by weight, more preferably from 0.05 to 2 parts by weight, and particularly preferably from 0.1 to 1 part by weight based on 100 parts by weight of the polylactic acid-based resin.

The polylactic acid-based resin extrudate extruded through the nozzle die 1 enters a cutting step successively. The cutting of the polylactic acid-based resin extrudate is performed by rotating the rotary shaft 2 and then rotating rotary blades 5, 5 . . . provided on the front end surface 1a of the nozzle die 1 at a constant rotation speed of from 2000 to 10000 rpm.

All the rotary blades 5 are rotating while being always in contact with the front end surface 1a of the nozzle die 1, and the polylactic acid-based resin extrudate extrusion-foamed through the nozzle die 1 is cut into polylactic acid-based resin foamed particles in the air at constant time intervals by a shearing stress generated between the rotary blades 5 and the end of the outlet 11 of a nozzle in the nozzle die 1. At this time, water may be sprayed to the polylactic acid-based resin extrudate unless the polylactic acid-based resin extrudate is cooled excessively.

In the present invention, a polylactic acid-based resin is kept from foaming in the nozzle of the nozzle die 1. The polylactic acid-based resin has not foamed immediately after being discharged from the outlet 11 of a nozzle of the nozzle die 1 and begins to foam after a slight lapse of time from being discharged. Thus, the polylactic acid-based resin extrudate is composed of an unfoamed portion immediately after being extruded from the outlet 11 of a nozzle of the nozzle die 1 and a foaming portion which is contiguous to the unfoamed portion and which was extruded prior to the unfoamed portion and is foaming.

The unfoamed portion maintains its state after being extruded from the outlet 11 of a nozzle of the nozzle die 1 until it begins to foam. The time during which the unfoamed portion is maintained may be adjusted by, for example, the resin pressure at the outlet 11 of a nozzle of the nozzle die 1 and the amount of a foaming agent. When the resin pressure at the outlet 11 of a nozzle of the nozzle die 1 is high, the polylactic acid-based resin extrudate keeps an unfoamed state without foaming immediately after being extruded from the nozzle die 1. The resin pressure at the outlet 11 of a nozzle of the nozzle die 1 can be adjusted by the aperture diameter of the nozzle, the extrusion rate, the melt viscosity and the melt tension of the polylactic acid-based resin. It is possible to prevent the polylactic acid-based resin from foaming within a mold and to form an unfoamed portion surely by adjusting the amount of the foaming agent to a proper amount.

The extrusion temperature of the polylactic acid-based resin (the temperature of the polylactic acid-based resin at the tip of the extruder) is preferably a temperature which is 10 to 50° C. higher than the melting point of the polylactic acid-based resin, more preferably is a temperature which is 15 to 45° C. higher than the melting point of the polylactic acid-based resin, and particularly preferably a temperature which is 20 to 40° C. higher than the melting point of the polylactic acid-based resin. This is because if the extrusion temperature of a polylactic acid-based resin is low, fracture occurs, so that the resulting polylactic acid-based resin foamed particles easily attach to each other, whereas if the extrusion temperature of a polylactic acid-based resin is high, decomposition of the polylactic acid-based resin is promoted and the foaming property and the open cell ratio of the resulting polylactic acid-based resin foamed particle are apt to decrease.

Since all the rotary blades 5 cut the polylactic acid-based resin extrudate while being always in contact with the front end surface 1a of the nozzle die 1, the polylactic acid-based resin extrudate is cut at the unfoamed part immediately after being discharged from the outlet 11 of a nozzle of the nozzle die 1, whereby polylactic acid-based resin foamed particles are produced.

Since a polylactic acid-based resin extrudate is cut at its unfoamed portion, the resulting polylactic acid-based resin foamed particles have no cut sections of cells in their cut surfaces. The surfaces of the polylactic acid-based resin foamed particles are coated entirely with a skin layer having no cut sections of cells. The polylactic acid-based resin foamed particles, therefore, have excellent foaming property without leaking of foaming gas and is low in open cell ratio. Moreover, they are excellent in thermal fusion bonding property of their surfaces.

When polylactic acid-based resin foamed particles are used for in-mold foam-molding, the thermal fusion bonding property of the foamed particles is good and a polylactic acid-based resin foam-molded article obtained therefrom is excellent in appearance without having surface unevenness and has excellent mechanical strength because the surface of each polylactic acid-based resin foamed particle is formed of a skin layer having no cut sections of cells exposed.

Moreover, while the rotary blade 5 is rotating at a fixed rotation speed as mentioned above, the rotation speed of the rotary blade 5 is limited to 2000 to 10000 rpm, preferably 3000 to 9000 rpm, and more preferably 4000 to 8000 rpm.

This is because if the speed of the rotary blade 5 is lower than 2000 rpm, it is not possible to cut a polylactic acid-based resin extrudate surely with the rotary blade 5 and, as a result, polylactic acid-based resin foamed particles may unite with each other or the polylactic acid-based resin foamed particles may become uneven in shape.

That is also because if the rotation speed of the rotary blade 5 is higher than 10000 rpm, the following problems arise. The first problem is that the cutting stress caused by the rotary blade becomes greater and therefore the initial speed of polylactic acid-based resin foamed particles becomes higher when the polylactic acid-based resin foamed particles are scattered from the outlet of a nozzle toward a cooling member. As a result, the time from the cutting of the polylactic acid-based resin extrudate to the collision of the polylactic acid-based resin foamed particles with the cooling member becomes shorter, so that the polylactic acid-based resin foamed particles foam insufficiently, resulting in a low expansion ratio of the polylactic acid-based resin foamed particles. The second problem is that the lifetimes of the rotary blade and the rotary becomes shorter because of increase in abrasion of the rotary blade and the rotary shaft.

The polylactic acid-based resin foamed particles obtained in the manner described above are scattered outward or forward by a cutting stress produced by the rotary blade 5 concurrently with cutting and collide immediately with the inner peripheral surface of the peripheral wall portion 41b of the cooling drum 41. The polylactic acid-based resin foamed particles continue to foam until they collide with the cooling drum 41, and the polylactic acid-based resin foamed particles have grown to a substantially spherical shape through foaming.

The inner peripheral surface of the peripheral wall portion 41b of the cooling drum 41 is coated entirely with the cooling liquid 42, and the polylactic acid-based resin foamed particles which collided with the inner peripheral surface of the peripheral wall portion 41b of the cooling drum 41 are cooled immediately and, thereby, foaming of the polylactic acid-based resin foamed particles stops. Thus, since the polylactic acid-based resin foamed particles are cooled with the cooling liquid 42 immediately after the polylactic acid-based resin extrudate is cut with the rotary blade 5, the crystallinity degree of the polylactic acid-based resin forming the polylactic acid-based resin foamed particle is prevented from increasing and the polylactic acid-based resin foamed particles are prevented from foaming excessively.

The polylactic acid-based resin foamed particles, therefore, demonstrate excellent foaming property and excellent thermal fusion bonding property in in-mold foam-molding. Moreover, it is possible to increase the heat resistance of the polylactic acid-based resin by increasing the crystallinity degree of the polylactic acid-based resin foamed particles at the time of in-mold foam-molding, the resulting polylactic acid-based resin foamed article has excellent heat resistance.

If the temperature of the cooling liquid 42 is excessively low, the nozzle die located in the vicinity of the cooling drum 41 is cooled excessively, so that a bad influence may appear in extrusion-foaming of a polylactic acid-based resin, whereas if it is excessively high, the crystallinity degree of the polylactic acid-based resin forming the polylactic acid-based resin foamed particles becomes high, so that the thermal fusion bonding property of the polylactic acid-based resin foamed particles may decrease. It is therefore preferably 0 to 45° C., more preferably 5 to 40° C., and particularly preferably 10 to 35° C.

The crystallinity degree of polylactic acid-based resin foamed particles to be obtained is preferably 30% or less, more preferably 3 to 28%, and particularly preferably 5 to 26%. The crystallinity degree of polylactic acid-based resin foamed particles can be adjusted by the time from a polylactic acid-based resin extrudate is extruded from the nozzle die 1 and until the polylactic acid-based resin foamed particles collide with the cooling liquid 42, and the temperature of the cooling liquid 42.

The crystallinity degree of polylactic acid-based resin foamed particles can be calculated by the following formula, based on the amount of heat of cooling crystallization per 1 mg and the amount of heat of fusion per 1 mg measured while increasing the temperature at a temperature elevation rate of 10° C./min in accordance with the measuring method provided in JIS K7121 using a differential scanning calorimeter (DSC).

$$\text{Crystallinity degree (\%)} = \frac{\left| \begin{array}{c} \text{Amount of heat} \\ \text{of fusion per 1 mg} \end{array} \right| - \left| \begin{array}{c} \text{Amount of} \\ \text{heat of cooling} \\ \text{crystallization} \\ \text{per 1 mg} \end{array} \right|}{93 \text{ mJ/mg}} \times 100 \qquad [\text{Num. 1}]$$

As to the bulk density of the polylactic acid-based resin foamed particles obtained in such a manner, if it is excessively small, the open cell ratio of the polylactic acid-based resin foamed particles increases, so that there is a fear that it may be impossible to impart to the polylactic acid-based resin foamed particles a foaming force required at the time of foaming in in-mold foam-molding, whereas if it is excessively large, cells in the polylactic acid-based resin foamed particles obtained become uneven, so that the polylactic acid-based resin foamed particles at the time of in-mold foam-molding may become insufficient in foaming property. It is therefore preferably 0.02 to 0.6 g/cm$^3$, more preferably 0.03 to 0.5 g/cm$^3$, and particularly preferably 0.04 to 0.4 g/cm$^3$.

The open cell ratio of polylactic acid-based resin foamed particles is preferably less than 20%, more preferably 10% or less, and particularly preferably 5% or less because if it is excessively high, the polylactic acid-based resin foam-molded articles hardly foam in in-mold foam-molding and the fusion bonding of the polylactic acid-based resin foamed particles decreases, so that the mechanical strength of the resulting polylactic acid-based resin foam-molded article may decrease. The adjustment of the open cell ratio of polylactic acid-based resin foamed particles is performed by adjusting the extrusion-foaming temperature of a polylactic acid-based resin from an extruder, the amount of a foaming agent fed to the extruder, etc.

The open cell ratio of polylactic acid-based resin foamed particles is measured in the following procedure. First, a sample cup of an air comparison type specific gravimeter is prepared, and the whole weight A (g) of polylactic acid-based resin foamed particles of a quantity filling up about 80% of the sample cup is measured. Next, the volume B (cm$^3$) of the whole polylactic acid-based resin foamed particles is measured by the 1-½-1 atmosphere method using the specific gravimeter. It is noted that an air comparison type specific gravimeter is commercially available, for example, under the commercial name "Model 1000" from Tokyo Science Co., Ltd.

Then, a container made of wire gauze is prepared. The container made of wire gauze is immersed in water and the weight C (g) of the container made of wire gauze in a state of being immersed in water is measured. Next, the whole portion of the polylactic acid-based resin foamed particles is put into the container made of wire gauze and the container made of wire gauze is then immersed in water. The combined weight D (g) of the container made of wire gauze and the polylactic acid-based resin foamed particles in the container made of wire gauze in a state that they are immersed in water is measured.

Then, the apparent volume E (cm$^3$) of the polylactic acid-based resin foamed particles is calculated based on the following formula, and the open cell ratio of the polylactic acid-based resin foamed particles can be calculated by the following formula based on the apparent volume E and the volume B (cm$^3$) of the whole polylactic acid-based resin foamed particles. The volume of 1 g of water was set to be 1 cm$^3$.

$$E=A+(C-D)$$

Open cell ratio(%)=100×(E−B)/E

The particle diameter of the polylactic acid-based resin foamed particles is preferably 0.5 to 5.0 mm, more preferably 1.0 to 4.5 mm, and particularly preferably 1.5 to 4 mm because if it is excessively small, the foaming property of the polylactic acid-based resin foamed particles at the time of in-mold foam-molding may decrease, whereas if it is excessively large, the filling property of the polylactic acid-based resin foamed particles into a mold at the time of in-mold foam-molding may decrease.

As to the particle diameter of the polylactic acid-based resin foamed particles, the diameter of a polylactic acid-based resin foamed particle can be measured directly with slide calipers. Specifically, the longest diameter (major axis) and the shortest diameter (minor axis) in the cut surface of each polylactic acid-based resin foamed particle are measured, and the length in the direction perpendicular to the cut surface in each polylactic acid-based resin foamed particle is measured. The arithmetic mean value of the major axis, the minor axis, and the length of the polylactic acid-based resin foamed particle is defined as the particle diameter of the polylactic acid-based resin foamed particle.

Polylactic acid-based resin foamed particles obtained in such a manner are filled into a cavity of a mold and are heated, so that the polylactic acid-based resin foamed particles are foamed. The polylactic acid-based resin foamed particles are whereby foamed, so that the foamed particles are fusion-bonded together by their foam pressures, and the crystallinity degree of the polylactic acid-based resin is increased. As a result, it is possible to obtain a polylactic acid-based resin foam-molded article with a desired shape which is excellent in fusion bonding property and heat resistance.

The medium for heating the polylactic acid-based resin foamed particles filled in the mold is not particularly restricted, and examples thereof include hot air, warm water and the like besides steam. It is preferable to use water of 60 to 100° C. This is because water is liquid and has great specific heat and it can therefore give a large amount of heat necessary for foaming of the polylactic acid-based resin foamed particles in the mold even if the temperature is low.

Therefore, it is possible to heat and foam polylactic acid-based resin foamed particles sufficiently without heating the polylactic acid-based resin foamed particles too much, and it is possible to fusion-bond the polylactic acid-based resin foamed particles firmly together due to their foaming force without causing thermal shrinkage of the surface of the polylactic acid-based resin foamed particles as generated when using steam or hot air as a heating medium. The polylactic acid-based resin foam-molded article obtained has excellent mechanical strength and is excellent in appearance.

Since in-mold foam-molding can be performed at a lower pressure in comparison to use of high pressure steam, the design strength of a mold can be kept low and a mold with a complicated shape can be produced easily. In addition, it is possible to make a mold itself compact and thereby enhancing the handleability of the mold, so that it is possible to increase the productivity of polylactic acid-based resin foam-molded articles.

The temperature of the water to be used as a heating medium is preferably 60 to 100° C., more preferably 70 to 99° C., and particularly preferably 80 to 98° C. because if it is excessively low, polylactic acid-based resin foamed particles filled in a mold foam insufficiently, so that the thermal fusion bonding property of the polylactic acid-based resin foamed particles decreases and, as a result, the mechanical strength or the appearance of the resulting polylactic acid-based resin foam-molded article may be deteriorated, whereas if it is excessively high, it is necessary to bring water into a high pressure state and therefore a large scale facility, such as a boiler, is needed.

A method for supplying water of 60 to 100° C. to polylactic acid-based resin foamed particles filled in a mold and heating the polylactic acid-based resin foamed particles is not particularly restricted, and examples thereof include such as (1) a method in which water of 60 to 100° C. instead of steam is fed into a mold in a conventionally used in-mold foam-molding machine, and (2) a method in which a mold filled with polylactic acid-based resin foamed particles is immersed in water of 60 to 100° C., thereby feeding the water into the polylactic acid-based resin foamed particles. The method (2) is preferred because it is possible to heat the whole mold uniformly, that is, it is possible to uniformly heat and foam the polylactic acid-based resin foamed particle entirely, even if the mold is complex in shape.

The period of time for heating by water of polylactic acid-based resin foamed particles filled in a mold is preferably 20 seconds to 1 hour because if it is excessively short, the polylactic acid-based resin foamed particles are heated insufficiently and, as a result, the polylactic acid-based resin foamed particles are thermally fusion-bonded insufficiently or the crystallinity degree of the polylactic acid-based resin foamed particles fails to increase insufficiently, so that the heat resistance of the resulting polylactic acid-based resin foam-molded article may be deteriorated, whereas if it is excessively long, the productivity of polylactic acid-based resin foam-molded articles only decreases.

It is possible to obtain polylactic acid-based resin foam-molded article with a desired shape by subjecting polylactic acid-based resin foamed particles to in-mold foam-molding by heating them with water of 60 to 100° C., then cooling the polylactic acid-based resin foam-molded article formed in the mold, and then opening the mold.

As to the cooling of the polylactic acid-based resin foam-molded article formed in the mold, the cooling is performed preferably so that the surface temperature of the polylactic acid-based resin foam-molded article will become 50° C. or lower, more preferably 0 to 45° C., and most preferably 0 to 40° C. because there is a fear that if it is excessively high, polylactic acid-based resin foamed particles in the mold are not solidified sufficiently and, therefore, they may fail to become a polylactic acid-based resin foam-molded article in conformity with the cavity shape of the mold due to expansion which occurs at the time of removal from the mold.

A method for cooling the polylactic acid-based resin foam-molded article formed in the mold is not particularly restricted, and examples thereof include (1) a method in which the mold is left in an atmosphere of 50° C. or less, (2) a method in which water or air of 50° C. or less is blown to the mold, and (3) a method in which the mold is immersed in water of 50° C. or less. The cooling method (3) is preferred because it is possible to uniformly cool a mold entirely even if the mold is complex in shape. The cooling time may be adjusted appropriately depending upon the cooling method or the size of a mold and, for example, when a mold is immersed in water of 50° C. or less, it is preferably 1 to 10 minutes.

As to the crystallinity degree of the resulting polylactic acid-based resin foam-molded article, if it is excessively low, the heat resistance of the polylactic acid-based resin foam-molded article is deteriorated, whereas if it is excessively high, the polylactic acid-based resin foam-molded article may become fragile. Therefore, it is preferable to adjust the in-mold foam-molding conditions so that the crystallinity degree will become 40 to 65%, more preferably 45 to 64%, and particularly preferably 50 to 63%. Since the crystallinity degree of a polylactic acid-based resin foam-molded article is measured by a method similar to the method for measuring the crystallinity degree of polylactic acid-based resin foamed particles, the description thereof is omitted.

The material which forms the mold is not particularly restricted, and examples thereof include such as iron-based metals, aluminum-based metals, copper-based metals and zinc-based metals. Aluminum-based metals are preferred from the viewpoint of thermal conductivity and processability.

Moreover, it is also permissible to further impregnate polylactic acid-based resin foamed particles with an inert gas to increase the foaming force of the polylactic acid-based resin foamed particles. Such an increase in foaming force of polylactic acid-based resin foamed particles leads to an improvement in fusion bonding property between polylactic acid-based resin foam-molded articles at the time of in-mold foam-molding and, as a result, the a resulting polylactic acid-based resin foam-molded article has further improved mechanical strength. Examples of the inert gas include such as carbon dioxide, nitrogen, helium and argon, and carbon dioxide is preferred.

Examples of the method for impregnating polylactic acid-based resin foamed particles with an inert gas include a method in which polylactic acid-based resin foamed particles are placed under an atmosphere of an inert gas having a pressure as high as atmospheric pressure or higher and whereby the polylactic acid-based resin foamed particles are impregnated with the inert gas. In such a case, although polylactic acid-based resin foamed particles may be impregnated with an inert gas before being filled into a mold, it is also permissible that polylactic acid-based resin foamed particles are filled into a mold and then the mold is placed together with the foamed particles under an inert gas atmosphere and whereby the polylactic acid-based resin foamed particles are impregnated with an inert gas.

The temperature applied when polylactic acid-based resin foamed particles are impregnated with an inert gas is preferably −40 to 25° C., and more preferably −10 to 20° C. This is because if the temperature is excessively low, polylactic acid-based resin foamed particles are cooled too much and, as a result, it is impossible to heat the polylactic acid-based resin foamed particles sufficiently in in-mold foam-molding and, therefore, the thermal fusion bonding property between the polylactic acid-based resin foamed particles is deteriorated, so that the mechanical strength of the resulting polylactic acid-based resin foam-molded article may be deteriorated. On the other hand, if the temperature is excessively high, the impregnation amount of the inert gas into the polylactic acid-based resin foamed particles becomes small, so that it may be impossible to impart sufficient foaming property to the polylactic acid-based resin foamed particles; and the crystallization of the polylactic acid-based resin foamed particles is promoted and whereby the thermal fusion bonding property of the polylactic acid-based resin foamed particles is deteriorated, so that the mechanical strength of the resulting polylactic acid-based resin foamed particle may be deteriorated.

The pressure applied when polylactic acid-based resin foamed particles are impregnated with an inert gas is preferably 0.2 to 1.6 MPa, and more preferably 0.28 to 1.2 MPa. When the inert gas is carbon dioxide, it is preferably 0.2 to 1.5 MPa, and more preferably 0.25 to 1.2 MPa. This is because if the pressure is excessively low, the impregnation amount of the inert gas into the polylactic acid-based resin foam-molded articles becomes small and whereby it is impossible to impart sufficient foaming property to the polylactic acid-based resin foamed particles, so that the mechanical strength of the resulting polylactic acid-based resin foamed particle may be deteriorated.

On the other hand, if the pressure is excessively high, the crystallinity degree of the polylactic acid-based resin foam-molded articles increases and whereby the thermal fusion bonding property of the polylactic acid-based resin foamed particles decreases, so that the mechanical strength of the resulting polylactic acid-based resin foamed particle may be deteriorated.

The period of time for impregnating polylactic acid-based resin foamed particles with an inert gas is preferably 20 minutes to 24 hours, more preferably 1 to 18 hours, and particularly preferably 3 to 8 hours. When the inert gas is carbon dioxide, it is preferably 20 minutes to 24 hours. This is because if the impregnation time is excessively short, it is impossible to impregnate polylactic acid-based resin foamed particles with an inert gas sufficiently. On the other hand, if the impregnation time is excessively long, the production efficiency of a polylactic acid-based resin foam-molded article decreases.

By impregnating polylactic acid-based resin foamed particles with an inert gas at −40 to 25° C. under a pressure of 0.2 to 1.6 MPa as described above, it is possible to increase the foaming property while restraining the crystallinity degree of the polylactic acid-based resin foamed particles from increasing, and it is therefore possible to thermally fusion-bond the polylactic acid-based resin foamed particles strongly with a sufficient foaming force and to obtain a polylactic acid-based resin foam-molded article excellent in mechanical strength, especially impact strength.

When polylactic acid-based resin foamed particles is impregnated with an inert gas as described above, although it is permissible to heat and foam the polylactic acid-based resin foamed particles as they are within a mold, it is also permissible to heat the polylactic acid-based resin foamed particles to undergo secondary foaming before filling them into a mold, and after rendering them highly foamed secondarily foamed particles, it is permissible to fill them into the mold, followed by heating and foaming. The use of such secondarily foamed particles make it possible to obtain a polylactic acid-based resin foam-molded article that is high in expansion ratio. As a heating medium for heating polylactic acid-based resin foamed particles, dry air is preferred.

The temperature for foaming polylactic acid-based resin foamed particles to convert into secondarily foamed particle is preferably lower than 70° C. because if it is excessively high, the crystallinity degree of the polylactic acid-based resin increases and whereby the thermal fusion bonding property between secondarily foamed particles decreases, so that the mechanical strength and the appearance of the resulting polylactic acid-based resin foam-molded article are deteriorated.

When filling secondarily foamed particles into a mold for molding, it is preferable to increase the foaming property of the secondarily foamed particles by impregnating the secondarily foamed particles with an inert gas under the same conditions and the same procedure as those applied in the case of impregnating polylactic acid-based resin foamed particles with an inert gas.

When both polylactic acid-based resin foamed particles and secondarily foamed particles are impregnated with inert gases, the inert gases may be either of different kinds or of the same kind, but they are preferably of the same kind.

The rate of fusion bonding of the resulting polylactic acid-based resin foam-molded article is preferably 40% or more, more preferably 50% or more, and particularly preferably 60% or more. Here, the rate of fusion bonding of a polylactic acid-based resin foam-molded article is one measured by the following procedure. First, a polylactic acid-based resin foam-molded article is bent and it is cut at predetermined position. Then, the total particle number $N_1$ of the foamed particles exposed to the cut surface of the polylactic acid-based resin foam-molded article is counted by visual observation and the number $N_2$ of the fractured particles, that is, the divided particles is counted by visual observation. The rate of fusion bonding can be calculated based on the following formula:

Rate of fusion bonding(%)=100×number $N_2$ of fractured particles/total particle number $N_1$ of foamed particles

Effect of the Invention

In the method of the present invention for producing polylactic acid-based resin foamed particles for in-mold foam-molding, a rotary blade is rotated at a given rotation speed while being always in contact with the front end surface of a nozzle and a polylactic acid-based resin extrudate extrusion-foamed through a nozzle is cut with the rotary blade, as described above. It is therefore possible to cut the polylactic acid-based resin extrudate surely to obtain substantially spherical polylactic acid-based resin foamed particles. Therefore, when polylactic acid-based resin foamed particles are used for in-mold foam-molding, the polylactic acid-based resin foamed particles foam uniformly in all directions and, as a result, the foamed particles are thermally fusion-bonded to unite together strongly in all direction.

The polylactic acid-based resin foamed particles are scattered by a cutting stress generated when a polylactic acid-based resin extrudate is cut, and they collide with a cooling member and are cooled immediately. Therefore, the crystallinity degree of the polylactic acid-based resin is suppressed and the particles exhibit excellent thermal fusion bonding property in in-mold foam-molding.

Moreover, in the present invention, a polylactic acid-based resin is extrusion-foamed and a nozzle die is used as a mold. Therefore, the resulting polylactic acid-based resin foamed particles contain fine cells and have a low open cell ratio.

Furthermore, because the present invention uses, as a polylactic acid-based resin, a polylactic acid-based resin which contains both optical isomers, a D-form and an L-form, as constituent monomer component, and the content of one of the optical isomers, the D-form or the L-form, whichever is less, being less than 5 mol %, or a polylactic acid-based resin which contains only one optical isomer, a D-form or an L-form, as a constituent monomer component, the resulting polylactic acid-based resin foamed particles are high in crystallinity and excellent in heat resistance.

The resulting polylactic acid-based resin foamed particles, therefore, demonstrate excellent foaming property and excellent thermal fusion bonding property in in-mold foam-molding, and the resulting polylactic acid-based resin molded article is excellent in appearance, heat resistance and mechanical strength.

In addition, when a cooling member is composed of a cylindrical cooling drum provided in front of a nozzle die and a cooling liquid which is running along the inner surface of the cooling drum, even if polylactic acid-based resin foamed particles obtained by cutting a polylactic acid-based resin extrudate with a rotary blade scatter any directions, it is possible to surely bring the polylactic acid-based resin foamed particles into contact with the cooling liquid to cool them. It is therefore possible to surely prevent the polylactic acid-based resin constituting the polylactic acid-based resin foamed particles from increasing in crystallinity degree and to render the polylactic acid-based resin foamed particles excellent in thermal fusion bonding property.

Further, a polylactic acid-based resin extrudate is composed of an unfoamed portion immediately after being extruded through a nozzle die and a foaming portion which is contiguous to the unfoamed portion and is foaming, and when the polylactic acid-based resin extrudate is cut within the above-mentioned unfoamed portion with a rotary blade, it is possible to make the whole surface of the resulting polylactic acid-based resin foamed particles be formed of a skin layer in which no cut sections of cells are exposed. Therefore, it is possible to surely prevent foaming gas from leaking at the time of foaming of polylactic acid-based resin foamed particles. In addition, the thermal fusion bonding property is improved due to enlarged contact area of foamed particles. Therefore, the resulting polylactic acid-based resin foamed particles are excellent in foaming property and thermal fusion bonding property.

Figure 1:
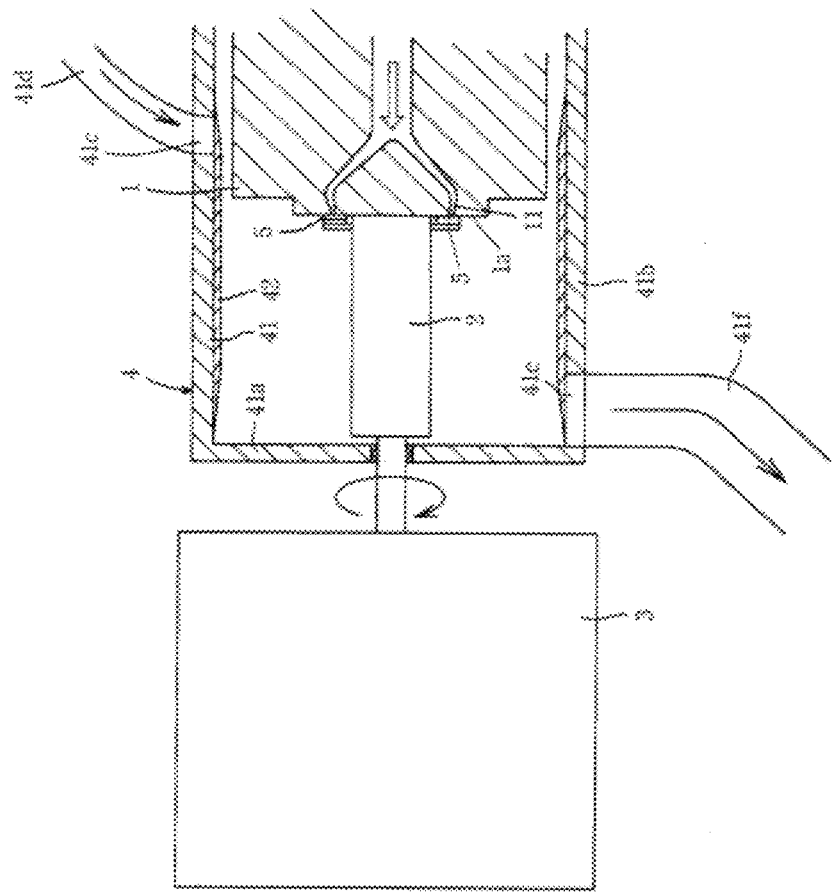
FIG. 1

A schematic diagram which illustrates one example of an apparatus for producing polylactic acid-based resin foamed particles for in-mold foam-molding.

FIG. 2

A schematic diagram of a multi-nozzle die viewed from the front.

FIG. 3

A photograph of a section which was cut with a rotary blade in the polylactic acid-based resin foamed particles obtained in Example 1.

FIG. 4

A photograph of a section which was cut with a rotary blade in the polylactic acid-based resin foamed particles obtained in Comparative Example 1.

EXPLANATION OF REFERENCE NUMERALS

| | |
|---|---|
| 1 | Nozzle die |
| 2 | Rotary shaft |
| 3 | Driving member |
| 4 | Cooling member |
| 41 | Cooling drum |
| 42 | Cooling liquid |
| 5 | Rotary blade |

BEST MODE FOR CARRYING OUT THE INVENTION

In the present invention, the bulk density of polylactic acid-based resin foamed particles and the apparent density, the compression strength, the flexural strength and the heat resistance of a polylactic acid-based resin foam-molded article are those measured by the procedures described below.

(Bulk Density of Polylactic Acid-Based Resin Foamed Particles)

The bulk density of polylactic acid-based resin foamed particles is one measured in accordance with JIS K6911 (1995) "Testing methods for thermosetting plastics." That is, a measurement was conducted using an apparent density tester in accordance with JIS K6911 and then the bulk density of polylactic acid-based resin foamed particles was measured based on the following equation.

Bulk density of polylactic acid-based resin foamed particles (g/cm$^3$)=[Mass of measuring cylinder with sample therein (g)−Mass of measuring cylinder (g)]/[Capacity of measuring cylinder (cm$^3$)]

(Apparent Density of Polylactic Acid-Based Resin Foam-Molded Article)

The apparent density of a polylactic acid-based resin foam-molded article is one measured by the method provided in JIS K6767 (1999) "Cellular plastics and rubbers-Determination of apparent density."

(Compression Strength of Polylactic Acid-Based Resin Foam-Molded Article)

First, a rectangular column-shaped specimen of 50 mm in length, 50 mm in width and 30 mm in height was cut out from a polylactic acid-based resin foam-molded article. Using this specimen, the compression strength at 5% compression was measured in accordance with the method provided in JIS A9511 (1995) "Cellular plastics thermal insulation materials" at a compression speed of 10 mm/min. In the measurement of the compression strength, a Tensilon universal testing machine (commercial name "UCT-10T" manufactured by ORIENTEC Co., Ltd.) was used.

(Flexural Strength of Polylactic Acid-Based Resin Foam-Molded Article)

First, a rectangular column-shaped specimen of 75 mm in length, 300 mm in width and 30 mm in height was cut out from a polylactic acid-based resin foam-molded article. Using this specimen, a maximum stress was measured in accordance with the method provided in JIS K7221 (1999) "Rigid cellular plastics—Flexural test—Part 2: Determination of flexural properties" at a compression speed of 10 mm/min, and the result was taken as a flexural strength (MPa). In the measurement of the maximum stress, a Tensilon universal testing machine (commercial name "UCT-10T" manufactured by ORIENTEC Co., Ltd.) was used.

(Heat Resistance of Polylactic Acid-Based Resin Foam-Molded Article)

The obtained polylactic acid-based resin foam-molded article was left over 22 hours in an electric oven kept at 120° C. Dimensions of the polylactic acid-based resin foam-molded article were measured before and after leaving in the electric oven. Then, a dimension change was calculated based on the following equation and it was evaluated as heat resistance. The dimension of the polylactic acid-based resin foam-molded article was defined as being an arithmetic mean value of the dimensions in the longitudinal direction, the transverse direction and the vertical direction.

Dimension change(%)=100×(Dimension after heating−Dimension before heating)/Dimension before heating (Appearance of Polylactic Acid-Based Resin Foam-Molded Article)

The appearance of an obtained polylactic acid-based resin foam-molded article was observed visually and evaluated based on the following criteria.

○ . . . No speckles was found in the surface of a foam-molded article.

x . . . Speckles were found in the surface of a foam-molded article.

In the surface of the polylactic acid-based resin foam-molded article obtained by using polylactic acid-based resin foamed particles having cut sections of cells in their surfaces, an area which corresponds to cut sections of cells of a polylactic acid-based resin foamed particle has low brilliance and looks dark, whereas an area which corresponds a skin layer of a polylactic acid-based resin foamed particle has brilliance and looks whitish. Therefore, the surface of a polylactic acid-based resin foam-molded article exhibits black and white speckled patterns containing whitish-looking areas and dark-looking areas, so that the appearance thereof is deteriorated. On the other hand, the surface of a polylactic acid-based resin foam-molded article obtained by using polylactic acid-based resin foamed particles having no cut sections of cells in their surfaces has brilliance overall and looks whitish, so that it is good in appearance.

(Impact Resistance)

A puncture impact test of a polylactic acid-based resin foam-molded article was carried out in accordance with ASTM D-3763 (Standard Test Method for Puncture Properties of Plastics Using Load and Displacement Sensors).

Specifically, from a polylactic acid-based resin foam-molded article was cut out a test piece having a width of 100 mm and a length of 100 mm and being the same as the foam-molded article in thickness. The total absorption energy (J) of this test piece was measured using a Dynatup impact tester, commercial name "GRC8250" available from General Research Corp., under conditions including a test load of 3.17 kg, a test piece holding spun φ of 76 mm, and a test temperature of 23° C. The total absorption energy was taken as an index of impact resistance. For Examples 6 to 10 and Comparative Examples 3, 5 and 6, the test speed was set to be 1.90 m/sec. For Examples 1 to 5 and Comparative Example 1, the test speed was set to be 3.06 m/sec.

Example 1

Figure 2:
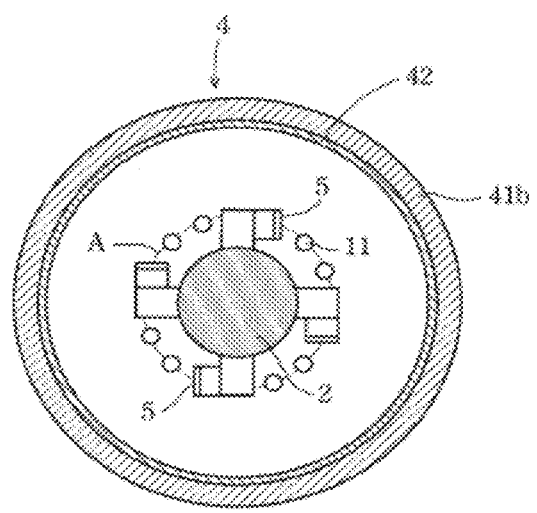

Polylactic acid-based resin foamed particles for in-mold foam-molding were produced using a manufacturing apparatus depicted in FIG. 1 and FIG. 2. First, 100 parts by weight of a crystalline polylactic acid-based resin (commercial name "TERRAMAC HV-6250H" produced by UNITIKA LTD., melting point (mp): 169.1° C., D-form ratio: 1.2 mol %, L-form ratio: 98.8 mol %, temperature T at an intersection of a storage modulus curve and a loss modulus curve, both obtained by a dynamic viscoelasticity measurement: 138.8° C.) and 0.1 parts by weight of a polytetrafluoroethylene powder (commercial name "Fluon L169J" produced by Asahi Glass Co., Ltd.) as a cell regulator were fed into a single screw extruder with a barrel diameter of 65 mm and then were melt-kneaded. In the single screw extruder, the polylactic acid-based resin was melt-kneaded at 190° C. at the beginning and then was melt-kneaded while the temperature thereof was increased to 220° C.

Then, butane containing 35% by weight of isobutane and 65% by weight of normal butane was pressed into the polylactic acid-based resin in a molten state so that the amount of the butane would become 1.0 parts by weight based on 100 parts by weight of the polylactic acid-based resin. Thus, the butane was dispersed uniformly in the polylactic acid-based resin.

Then, the polylactic acid-based resin in a molten state was cooled to 200° C. at the tip portion of the extruder, and subsequently, the polylactic acid-based resin was extrusion-foamed at a shear rate of 7639 sec$^{-1}$ through each nozzle of the multi-nozzle die 1 attached to the front end of the single screw extruder. The temperature of the multi-nozzle die 1 was held at 200° C.

The multi-nozzle die 1 had 10 nozzles in which the outlets 11 had 1.0 mm in diameter and all the outlets 11 of the nozzles were located at equal intervals on an imaginary circle of 139.5 mm in diameter imagined on the front end surface 1a of the multi-nozzle die 1.

On the outer peripheral surface of the rear end portion of the rotary shaft 2, four rotary blades 5 were provided integrally at equal intervals in the circumferential direction of the rotary shaft 2. Each of the rotary blades 5 was configured so that it can move on the imaginary circle A while being always in contact with the front end surface 1a of the multi-nozzle die 1.

Moreover, the cooling member 4 had a cooling drum 41 composed of the front portion 41a having a circular shape and the cylindrical peripheral wall portion 41b extending backward from the peripheral edge of the front portion 41a and having an inner diameter of 315 mm. The cooling water 42 was fed into the cooling drum 41 through the feed pipe 41d and the feeding port 41c of the drum 41. Entirely on the inner surface of the peripheral wall portion 41b, the cooling water 42 having a temperature of 20° C. was flowing forward and spirally along the inner surface.

The rotary blades 5 provided on the front end surface 1a of the multi-nozzle die 1 were rotated at a rotation speed of 4800 rpm. The polylactic acid-based resin extrudates which were extrusion-foamed through the outlets 11 of the multi-nozzle die 1 were cut with the rotary blades 5 to produce substantially spherical polylactic acid-based resin foamed particles. Each of the polylactic acid-based resin extrudates were composed of an unfoamed portion immediately after being extruded through a nozzle of the multi-nozzle die 1 and a foaming portion which was contiguous to the unfoamed portion and was foaming. Each of the polylactic acid-based resin extrudates was cut at the opening edge of the outlet 11 of a nozzle and the cutting of the polylactic acid-based resin extrudate was performed within the unfoamed portion.

In the production of the polylactic acid-based resin foamed particles, first, no rotary shaft 2 was installed in the multi-nozzle die 1, and the cooling member 4 was kept retracted from the multi-nozzle die 1. In this state, a polylactic acid-based resin extrudate was extrusion-foamed from the single screw extruder, and it was confirmed that the polylactic acid-based resin extrudate was composed of an unfoamed portion immediately after being extruded through a nozzle of the multi-nozzle die 1 and a foaming portion which was contiguous to the unfoamed portion and was foaming. Next, the rotary shaft 2 was installed to the multi-nozzle die 1 and the cooling member 4 was disposed at a predetermined position. Then, the rotary shaft 2 was rotated and a polylactic acid-based resin extrudate was cut with rotary blades 5 at the opening edge of the outlet 11 of the nozzle to produce polylactic acid-based resin foamed particles.

The polylactic acid-based resin foamed particles were scattered outward or forward by the cutting stress caused by the rotary blades 5 and collided with the cooling water 42 flowing along the inner surface of the cooling drum 41 of the cooling member 4, thereby being cooled immediately.

The cooled polylactic acid-based resin foamed particles were discharged together with the cooling water 42 through the discharging port 41e of the cooling drum 41 and then were separated from the cooling water 42a with a dehydrator. The obtained polylactic acid-based resin foamed particles had particle diameters of 2.2 to 2.6 mm and a bulk density of 0.21 g/cm$^3$.

Figure 3:
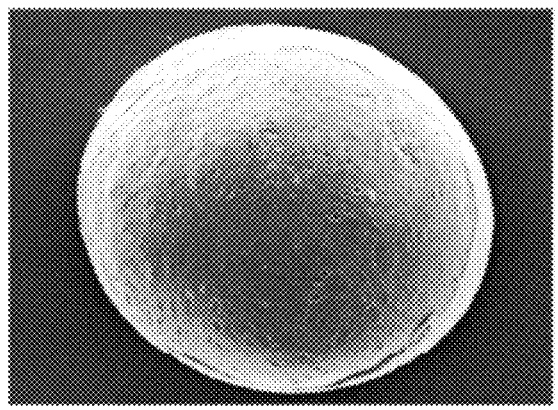

The photograph of the obtained polylactic acid-based resin foamed particles is shown in FIG. 3. The surface of each polylactic acid-based resin foamed particle was entirely covered with a skin layer. No cut sections of cells were present in the skin layer.

Next, the polylactic acid-based resin foamed particles were put into a hermetic container. Carbon dioxide was then pressed into the hermetic container at a pressure of 0.3 MPa and was left at 20° C. over 24 hours. Thus, the polylactic acid-based resin foamed particles were impregnated with carbon dioxide.

Subsequently, the polylactic acid-based resin foamed particles were filled into a cavity of a mold made of aluminum. The internal dimension of the cavity of the mold was a rectangular column shape of 30 mm in length, 300 mm in width and 300 mm in height. The mold was provided with 252 circular feeding ports having a diameter of 8 mm at 20 mm intervals in order to connect the inside of the cavity of the mold and the outside of the mold. Each of the feeding ports had a lattice part having an opening width of 1 mm. The feeding port was configured so that polylactic acid-based resin foamed particles filled in the mold would not be allowed to flow out of the mold through the feeding port, whereas water could be fed from the outside of the mold to the inside of the cavity through the feeding port of the mold.

Water maintained at 95° was pooled in a heating water bath, and the mold in which the polylactic acid-based resin foamed particles were filled was immersed completely in the water in the heating water bath over 5 minutes. Water was fed to the polylactic acid-based resin foamed particles in the cavity of the mold through the feeding port of the mold, and the polylactic acid-based resin foamed particles were heated to foam. Thus, the polylactic acid-based resin foamed particles were thermally fusion-bonded to unite.

Next, the mold was removed from the heating water bath. Then, water maintained at 20° was pooled in another cooling water bath. The mold was immersed in the cooling water bath completely over 5 minutes, so that the polylactic acid-based resin foamed particles in the mold were cooled.

The mold was removed from the cooling water bath and then was opened. Thus, a rectangular column-shaped polylactic acid-based resin foam-molded article was obtained.

The resulting polylactic acid-based resin foamed particle foam-molded article had an excellent appearance.

Example 2

Polylactic acid-based resin foamed particles and a polylactic acid-based resin foam-molded article were obtained in the same manner as described in Example 1 except for changing the number of rotary blades 5 to 2 and providing the rotary blades 5 integrally on the outer peripheral surface of the rear end portion of the rotary shaft 2 at equal distances along the circumferential direction of the rotary shaft 2 (providing the rotary blades 5, 5 integrally at positions on the outer peripheral surface of the rear end portion of the rotary shaft 2, the positions being opposite in the diameter direction of the rotary shaft 2) and adjusting the rotation speed of the rotary blades 5 to 7800 rpm.

The obtained polylactic acid-based resin foamed particles had a particle diameter of 1.8 to 3.3 mm. The resulting polylactic acid-based resin foamed particle foam-molded article had an excellent appearance.

Example 3

Polylactic acid-based resin foamed particles and a polylactic acid-based resin foam-molded article were obtained in the same manner as described in Example 1 except for using, as a polylactic acid-based resin, a resin composed of 100 parts by weight of a crystalline polylactic acid-based resin (commercial name "LACEA H-100" produced by Mitsui Chemicals, Inc., melting point: 171.4° C., D-form ratio: 0.9 mol %, L-form ratio: 99.1 mol %, temperature T at an intersection of a storage modulus curve and a loss modulus curve, both obtained by a dynamic viscoelasticity measurement: 107.0° C.) and 2 parts by weight of a masterbatch of an acrylic-styrene based compound, which is a crosslinking agent, having an epoxy group and a polylactic acid-based resin, and cooling a polylactic acid-based resin in a molten state to 200° C. in the tip portion of the extruder. The temperature of the multi-nozzle die 1 was held at 200° C.

The obtained polylactic acid-based resin foamed particles had a particle diameter of 2.2 to 2.6 mm. The resulting polylactic acid-based resin foamed particle foam-molded article had an excellent appearance.

Polylactic acid-based resin foamed particles were produced in the same manner as described above except for failing to press a foaming agent into the single screw extruder. A dynamic viscoelastic measurement was performed by use of the resulting polylactic acid-based resin particles for measurement. As a result, the temperature T at an intersection of a storage modulus curve and a loss modulus curve was 137.5° C. The melting point (mp) of polylactic acid-based resin which constituted the polylactic acid-based resin particles for measurement was measured to be 171.2° C.

Example 4

Polylactic acid-based resin foamed particles and a polylactic acid-based resin foam-molded article were obtained in the same manner as described in Example 1 except for adjusting the amount of the butane containing 35% by weight of isobutane and 65% by weight of normal butane to 1.5 parts by weight instead of 1.0 part by weight based on 100 parts by weight of the polylactic acid-based resin.

The obtained polylactic acid-based resin foamed particles had a particle diameter of 2.2 to 2.6 mm. The resulting polylactic acid-based resin foamed particle foam-molded article had an excellent appearance.

Example 5

Polylactic acid-based resin foamed particles and a polylactic acid-based resin foam-molded article were obtained in the same manner as described in Example 1 except for using a multi-nozzle die 1 that had 20 nozzles in which the outlet 11 had 1.0 mm in diameter, all the outlets 11 of the nozzles being located at equal intervals on an imaginary circle of 139.5 mm in diameter, and extrusion-foaming a polylactic acid-based resin through the nozzles of the multi-nozzle die 1 at a shear rate of 3820 sec$^{-1}$.

The obtained polylactic acid-based resin foamed particles had a particle diameter of 1.5 to 2.2 mm. The resulting polylactic acid-based resin foamed particle foam-molded article had an excellent appearance.

Example 6

Polylactic acid-based resin foamed particles, before being impregnated with carbon dioxide, obtained in Example 1 were fed into a 10 liter pressure container, which was then sealed hermetically. Into this pressure container, carbon dioxide was pressed at a pressure of 1.0 MPa, followed by being left at 20° C. over 6 hours. Thus, the polylactic acid-based resin foamed particles were impregnated with carbon dioxide.

The above-mentioned polylactic acid-based resin foamed particles were taken out from the pressure container and the polylactic acid-based resin foamed particles were immediately fed into a hot air dryer equipped with a stirrer. The polylactic acid-based resin foamed particles were heated to foam with dry hot air of 65° C. over 3 minutes under stirring. Thus, secondarily foamed particles were obtained which had a particle diameter of 2.6 to 3.6 mm, a bulk density of 0.048 g/cm$^3$ and a crystallinity degree of 20.2%.

The resulting polylactic acid-based resin foamed particles were fed into a hermetic container. Carbon dioxide was then pressed into the hermetic container at a pressure of 0.8 MPa and was left at 20° C. over 24 hours. Thus, the secondarily foamed particles were impregnated with carbon dioxide.

Subsequently, the secondarily foamed particles were filled into the cavity of the mold used in Example 1. Water maintained at 85° was pooled in a heating water bath. The mold in which the secondarily foamed particles were filled was immersed completely in the water in the heating water bath over 3 minutes. Water was fed to the secondarily foamed particles in the cavity of the mold through the feeding port of the mold, and the secondarily foamed particles were heated to foam. Thus, the polylactic acid-based resin foamed particles were thermally fusion bonded to unite.

Next, the mold was removed from the heating water bath. Then, water maintained at 20° was pooled in another cooling water bath, and the mold was immersed in the cooling water bath completely over 5 minutes, so that the polylactic acid-based resin foamed particles in the mold were cooled.

The mold was removed from the cooling water bath and then was opened. Thus, a rectangular column-shaped polylactic acid-based resin foam-molded article was obtained. The resulting polylactic acid-based resin foamed particle foam-molded article had an excellent appearance.

Example 7

Polylactic acid-based resin foamed particles were produced in the same manner as described in Example 1 except for using a multi-nozzle die 1 having the same structure as that of the multi-nozzle die 1 used in Example 1 except that the number of nozzles was 20 and that the diameter of the outlet 11 of each nozzle was 0.7 mm, extrusion-molding a polylactic acid-based resin at a shear rate of 11136 sec$^{-1}$ through the nozzles of the multi-nozzle die 1, changing the number of rotary blades 5 to 2 and providing the rotary blades 5, 5 integrally on the outer peripheral surface of the rear end portion of the rotary shaft 2 at equal distances along the circumferential direction of the rotary shaft 2 (providing the rotary blades 5, 5 integrally at positions on the outer peripheral surface of the rear end portion of the rotary shaft 2, the positions being opposite in the diameter direction of the rotary shaft 2). The polylactic acid-based resin foamed particles were fed into a 10 liter pressure container, which was then sealed hermetically. Into this pressure container, carbon dioxide was pressed at a pressure of 0.8 MPa, followed by being left at 20° C. over 5 hours. Thus, the polylactic acid-based resin foamed particles were impregnated with carbon dioxide.

The above-mentioned polylactic acid-based resin foamed particles were taken out from the pressure container and the polylactic acid-based resin foamed particles were immediately fed into a hot air dryer equipped with a stirrer. The polylactic acid-based resin foamed particles were heated to foam with dry hot air of 65° C. over 3 minutes under stirring. Thus, secondarily foamed particles were obtained which had a particle diameter of 2.6 to 3.6 mm, a bulk density of 0.059 g/cm$^3$ and a crystallinity degree of 20.2%.

The resulting secondarily foamed particles were fed into a hermetic container. Carbon dioxide was then pressed into the hermetic container at a pressure of 1.0 MPa and was left at 0° C. over 24 hours. Thus, the secondarily foamed particles were impregnated with carbon dioxide.

Subsequently, the secondarily foamed particles were filled into the cavity of the mold used in Example 1. Water maintained at 85° was pooled in a heating water bath. The mold in which the secondarily foamed particles were filled was immersed completely in the water in the heating water bath over 5 minutes. Water was fed to the secondarily foamed particles in the cavity of the mold through the feeding port of the mold, and the secondarily foamed particles were heated to foam. Thus, the secondarily foamed particles were thermally fusion-bonded to unite.

Next, the mold was removed from the heating water bath. Then, water maintained at 20° was pooled in another cooling water bath. The mold was immersed in the cooling water bath completely over 5 minutes, so that the polylactic acid-based resin foamed particles in the mold were cooled.

The mold was removed from the cooling water bath and then was opened. Thus, a rectangular column-shaped polylactic acid-based resin foam-molded article was obtained. The resulting polylactic acid-based resin foamed particle foam-molded article had an excellent appearance.

Example 8

A polylactic acid-based resin foam-molded article was obtained in the same manner as described in Example 7 except for adjusting the pressure to 0.3 MPa instead of 1.0 MPa and adjusting the temperature to −7° C. instead of 0° C. in impregnating secondarily foamed particles with carbon dioxide.

Example 9

A polylactic acid-based resin foam-molded article was obtained in the same manner as described in Example 7 except for adjusting the temperature to 13° C. instead of 0° C. in impregnating secondarily foamed particles with carbon dioxide.

Example 10

A polylactic acid-based resin foam-molded article was obtained in the same manner as described in Example 7 except for adjusting the temperature to 22° C. instead of 0° C. in impregnating secondarily foamed particles with carbon dioxide.

Comparative Example 1

100 parts by weight of a crystalline polylactic acid-based resin (commercial name "TERRAMAC HV-6250H" produced by UNITIKA LTD., melting point: 169.1° C., D-form ratio: 1.2 wt %, L-form ratio: 98.8 wt %, temperature T at an intersection of a storage modulus curve and a loss modulus curve, both obtained by a dynamic viscoelasticity measurement: 138.8° C.) and 0.1 parts by weight of a polytetrafluoroethylene powder (commercial name "Fluon L169J" produced by Asahi Glass Co., Ltd.) as a cell regulator were fed into a single screw extruder with a diameter of 65 mm and then were melt-kneaded. In the single screw extruder, the polylactic acid-based resin was melt-kneaded at 190° C. at the beginning and then was melt-kneaded while the temperature thereof was increased to 220° C.

Subsequently, butane containing 35% by weight of isobutane and 65% by weight of normal butane was pressed into the polylactic acid-based resin in a molten state so that the amount of the butane would become 0.7 parts by weight based on 100 parts by weight of the polylactic acid-based resin. Thus, the butane was dispersed uniformly in the polylactic acid-based resin.

Then, the polylactic acid-based resin in a molten state was cooled to 200° C. at the tip portion of the extruder, and subsequently, the resin was extrusion-foamed at a shear rate of 5659 sec$^{-1}$ through each nozzle of a multi-nozzle die attached to the tip of the single screw extruder to produce strand-shaped polylactic acid-based resin extrusion-foamed articles. The temperature of the multi-nozzle die was held at 200° C.

Subsequently, the strand-shaped polylactic acid-based resin extrusion-foaming articles were cooled by air cooling over a distance of 60 cm from the tip of each nozzle of the multi-nozzle die, and then the strand-shaped polylactic acid-based resin extrusion-foamed articles were floated on the water surface in a cooling water bath over a distance of 2 m to cool. The water temperature in the cooling water bath was 30° C.

The multi-nozzle die had 15 nozzles in which the outlets had 1.0 mm in diameter and the land portion was 7 mm in length. The resin temperature in execution of extrusion-foaming through a nozzle of the multi-nozzle die, which was measured by inserting a breaker plate between the tip portion of the single screw extruder and the die and inserting a thermocouple into the center part of the breaker plate, was 204° C.

The strand-shaped polylactic acid-based resin extrusion-foamed articles were fully drained and then the polylactic acid-based resin extrusion-foamed articles were cut with a fan cutter type pelletizer at 2.3 mm intervals into a solid cylindrical shape. Thus, polylactic acid-based resin foamed particles were obtained. The obtained polylactic acid-based resin foamed particles had a particle diameter of 1.7 to 2.3 mm.

Figure 4:
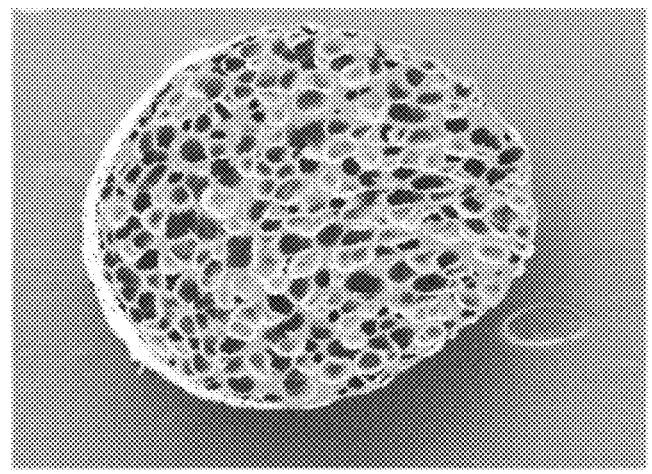

The photograph of the obtained polylactic acid-based resin foamed particles is shown in FIG. 4. In the surfaces of the polylactic acid-based resin foamed particles, many cut sections of cells were formed.

Next, the polylactic acid-based resin foamed particles were put into a hermetic container. Carbon dioxide was then pressed into the hermetic container at a pressure of 0.49 MPa and was left at 20° C. over 24 hours. Thus, the polylactic acid-based resin foamed particles were impregnated with carbon dioxide.

Subsequently, a polylactic acid-based resin foam-molded article was produced in the same manner as described in Example 1 using the obtained polylactic acid-based resin foamed particles.

Comparative Example 2

The production of a polylactic acid-based resin foamed particle was attempted in the same manner as described in Example 1 except for changing the number of rotary blades 5 to 2 and providing the rotary blades 5, 5 integrally on the outer peripheral surface of the rear end portion of the rotary shaft 2 at equal distances along the circumferential direction of the rotary shaft 2 (providing the rotary blades 5, 5 integrally at positions on the outer peripheral surface of the rear end portion of the rotary shaft 2, the positions being opposite in the diameter direction of the rotary shaft 2) and adjusting the rotation speed of the rotary blades 5 to 1800 rpm. However, polylactic acid-based resin foamed particles joined together and no satisfactory polylactic acid-based resin foamed particles could be obtained.

Comparative Example 3

Secondarily foamed particles were obtained in the same manner as described in Example 6 using the polylactic acid-based resin foamed particles obtained in Comparative Example 1. The resulting secondarily foamed particles had a particle diameter of 2.3 to 3.5 mm, but the bulk density thereof was as high as 0.060 g/cm³. A polylactic acid-based resin foam-molded article was obtained in the same manner as described in Example 6 using the secondarily foamed particles obtained.

Comparative Example 4

Polylactic acid-based resin foamed particles were obtained in the same manner as described in Example 1 except for feeding 100 parts by weight of a crystalline polylactic acid-based resin (commercial name "LACEA H-360" produced by Mitsui Chemicals, Inc., melting point (mp): 142.5° C., D-form ratio: 6.0 mol %, L-form ratio: 94.0 mol %, temperature T at an intersection of a storage modulus curve and a loss modulus curve, both obtained by a dynamic viscoelasticity measurement: 112.7° C.) and 0.1 parts by weight of a polytetrafluoroethylene powder (commercial name "Fluon L169J" produced by Asahi Glass Co., Ltd.) as a cell regulator to a single screw extruder with a diameter of 65 mm. The polylactic acid-based resin was melt-kneaded in a single screw extruder at 175° C. at the beginning and then was melt-kneaded while the temperature thereof was increased to 185° C. Then, the resulting polylactic acid-based resin in a molten state was cooled to 195° C. at the tip portion of the single screw extruder and extrusion-foamed through a multi-nozzle die 1 maintained at 195° C. The obtained polylactic acid-based resin foamed particles had a particle diameter of 2.2 to 2.6 mm.

A polylactic acid-based resin foam-molded article was obtained in the same manner as described in Example 1 except for using the obtained polylactic acid-based resin foamed particles and maintaining the water in the heating water bath at 70° C.

Comparative Example 5

A polylactic acid-based resin foam-molded article was obtained in the same manner as described in Example 7 except for adjusting the temperature to 28° C. instead of 0° C. in impregnating secondarily foamed particles with carbon dioxide.

Comparative Example 6

A polylactic acid-based resin foam-molded article was obtained in the same manner as described in Example 7 except for adjusting the pressure to 0.1 MPa instead of 1.0 MPa in impregnating secondarily foamed particles with carbon dioxide.

Comparative Example 7

A polylactic acid-based resin foam-molded article was obtained in the same manner as described in Example 7 except for adjusting the pressure to 1.7 MPa instead of 1.0 MPa in impregnating secondarily foamed particles with carbon dioxide.

The bulk density, the open cell ratio and the crystallinity degree of the polylactic acid-based resin foamed particles and the secondarily foamed particles obtained in the examples and the comparative example described above, and the apparent density, the compression strength, the flexural strength, the rate of fusion bonding, the heat resistance, the crystallinity degree, the appearance and the impact resistance of the polylactic acid-based resin foam-molded articles were measured in the procedures described above, and the results are shown in Tables 2 to 4.

TABLE 1

| | Polylactic acid-based resin | | | |
|---|---|---|---|---|
| | D-form ratio (mol %) | L-form ratio (mol %) | Melting point (° C.) | Intersection temperature T (° C.) |
| Example 1 | 1.2 | 98.8 | 169.1 | 138.8 |
| Example 2 | 1.2 | 98.8 | 169.1 | 138.8 |
| Example 3 | 0.9 | 99.1 | 171.2 | 137.5 |
| Example 4 | 1.2 | 98.8 | 169.1 | 138.8 |
| Example 5 | 1.2 | 98.8 | 169.1 | 138.8 |
| Example 6 | 1.2 | 98.8 | 169.1 | 138.8 |
| Example 7 | 1.2 | 98.8 | 169.1 | 138.8 |
| Example 8 | 1.2 | 98.8 | 169.1 | 138.8 |
| Example 9 | 1.2 | 98.8 | 169.1 | 138.8 |
| Example 10 | 1.2 | 98.8 | 169.1 | 138.8 |
| Comparative Example 1 | 1.2 | 98.8 | 169.1 | 138.8 |
| Comparative Example 2 | 1.2 | 98.8 | 169.1 | 138.8 |
| Comparative Example 3 | 1.2 | 98.8 | 169.1 | 138.8 |
| Comparative Example 4 | 6.0 | 94.0 | 142.5 | 112.7 |
| Comparative Example 5 | 1.2 | 98.8 | 169.1 | 138.8 |
| Comparative Example 6 | 1.2 | 98.8 | 169.1 | 138.8 |
| Comparative Example 7 | 1.2 | 98.8 | 169.1 | 138.8 |

TABLE 2

| | Mold | | Rotary blade | | Polylactic acid-based resin foamed particle | | | | | |
|---|---|---|---|---|---|---|---|---|---|---|
| | | Nozzle | Number of | Rotation | Bulk | | | Impregnation conditions | | |
| | Number of nozzles | diameter (mm) | blades (blades) | speed (rpm) | density (g/cm³) | Open cell ratio (%) | Crystallinity degree (%) | Pressure (MPa) | Temperature (° C.) | Time (hour) |
| Example 1 | 10 | 1.0 | 4 | 4,800 | 0.21 | 2.4 | 18.4 | 0.3 | 20 | 24 |
| Example 2 | 10 | 1.0 | 2 | 7,800 | 0.21 | 2.2 | 18.2 | 0.3 | 20 | 24 |
| Example 3 | 10 | 1.0 | 4 | 4,800 | 0.21 | 3.6 | 20.7 | 0.3 | 20 | 24 |
| Example 4 | 10 | 1.0 | 4 | 4,800 | 0.14 | 13.0 | 20.2 | 0.3 | 20 | 24 |
| Example 5 | 20 | 1.0 | 4 | 4,800 | 0.21 | 2.5 | 18.4 | 0.3 | 20 | 24 |
| Example 6 | 10 | 1.0 | 4 | 4,800 | 0.21 | 2.4 | 18.4 | 1.0 | 20 | 6 |
| Example 7 | 20 | 0.7 | 2 | 4,800 | 0.21 | 2.1 | 18.1 | 0.8 | 20 | 5 |
| Example 8 | 20 | 0.7 | 2 | 4,800 | 0.21 | 2.1 | 18.1 | 0.8 | 20 | 5 |
| Example 9 | 20 | 0.7 | 2 | 4,800 | 0.21 | 2.1 | 18.1 | 0.8 | 20 | 5 |
| Example 10 | 20 | 0.7 | 2 | 4,800 | 0.21 | 2.1 | 18.1 | 0.8 | 20 | 5 |
| Comparative Example 1 | 15 | 1.0 | — | — | 0.21 | 22.0 | 22.6 | 0.49 | 20 | 24 |
| Comparative Example 2 | 10 | 1.0 | 2 | 1,800 | 0.21 | — | — | — | — | — |
| Comparative Example 3 | 15 | 1.0 | — | — | 0.21 | 22.0 | 22.6 | 1.0 | 20 | 6 |
| Comparative Example 4 | 10 | 1.0 | 4 | 4,800 | 0.21 | 3.2 | 11.1 | 0.3 | 20 | 24 |
| Comparative Example 5 | 20 | 0.7 | 2 | 4,800 | 0.21 | 2.1 | 18.1 | 0.8 | 20 | 5 |
| Comparative Example 6 | 20 | 0.7 | 2 | 4,800 | 0.21 | 2.1 | 18.1 | 0.8 | 20 | 5 |
| Comparative Example 7 | 20 | 0.7 | 2 | 4,800 | 0.21 | 2.1 | 18.1 | 0.8 | 20 | 5 |

TABLE 3

| | Secondarily foamed particle | | | | | |
|---|---|---|---|---|---|---|
| | Bulk | | Crystallinity | Impregnation conditions | | |
| | density (g/cm³) | Open cell ratio (%) | degree (%) | Pressure (MPa) | Temperature (° C.) | Time (hour) |
| Example 1 | — | — | — | — | — | — |
| Example 2 | — | — | — | — | — | — |
| Example 3 | — | — | — | — | — | — |
| Example 4 | — | — | — | — | — | — |
| Example 5 | — | — | — | — | — | — |
| Example 6 | 0.048 | 2.0 | 20.2 | 0.8 | 20 | 24 |
| Example 7 | 0.059 | 1.9 | 20.2 | 1.0 | 0 | 24 |
| Example 8 | 0.059 | 1.9 | 20.2 | 0.3 | −7 | 24 |
| Example 9 | 0.059 | 1.9 | 20.2 | 1.0 | 13 | 24 |
| Example 10 | 0.059 | 1.9 | 20.2 | 1.0 | 22 | 24 |
| Comparative Example 1 | — | — | — | — | — | — |
| Comparative Example 2 | — | — | — | — | — | — |
| Comparative Example 3 | 0.060 | 15.3 | 24.1 | 0.8 | 20 | 24 |
| Comparative Example 4 | — | — | — | — | — | — |
| Comparative Example 5 | 0.059 | 1.9 | 20.2 | 1.0 | 28 | 24 |
| Comparative Example 6 | 0.059 | 1.9 | 20.2 | 0.1 | 0 | 24 |
| Comparative Example 7 | 0.059 | 1.9 | 20.2 | 1.7 | 0 | 24 |

TABLE 4

| | Polylactic acid-based resin foam-molded article | | | | | | | |
|---|---|---|---|---|---|---|---|---|
| | Apparent density (g/cm³) | Flexural strength (MPa) | Compression strength (MPa) | Rate of fusion bonding (%) | Heat resistance (%) | Crystallinity degree (%) | Appearance | Impact resistance |
| Example 1 | 0.21 | 2.50 | 2.03 | 80 | 0.2 | 50.7 | ○ | 9.2 |
| Example 2 | 0.21 | 2.44 | 1.98 | 80 | 0.2 | 50.9 | ○ | 9.5 |
| Example 3 | 0.21 | 2.52 | 2.01 | 80 | 0.2 | 51.3 | ○ | 9.1 |
| Example 4 | 0.14 | 1.50 | 0.97 | 80 | 0.2 | 53.0 | ○ | 3.9 |
| Example 5 | 0.21 | 2.48 | 2.00 | 80 | 0.2 | 50.6 | ○ | 9.4 |
| Example 6 | 0.048 | 0.39 | 0.15 | 70 | 0.7 | 61.1 | ○ | 1.8 |
| Example 7 | 0.059 | 0.53 | 0.32 | 70 | −0.5 | 51.1 | ○ | 2.64 |
| Example 8 | 0.059 | 0.54 | 0.30 | 70 | −0.6 | 50.0 | ○ | 2.5 |
| Example 9 | 0.059 | 0.53 | 0.33 | 70 | −0.6 | 50.1 | ○ | 2.41 |
| Example 10 | 0.059 | 0.49 | 0.30 | 60 | −0.6 | 50.4 | ○ | 1.92 |
| Comparative Example 1 | 0.21 | 2.38 | 1.82 | 70 | 0.2 | 50.9 | X | 8.2 |
| Comparative Example 2 | — | — | — | — | — | — | — | — |
| Comparative Example 3 | 0.060 | 0.44 | 0.20 | 60 | 0.8 | 53.0 | X | 1.5 |
| Comparative Example 4 | 0.21 | — | — | 80 | 5.8 | 39.8 | ○ | — |
| Comparative Example 5 | 0.059 | 0.36 | 0.22 | 40 | −0.6 | 49.4 | ○ | 1.72 |
| Comparative Example 6 | 0.059 | — | 0.15 | 40 | −0.8 | — | ○ | 1.6 |
| Comparative Example 7 | 0.059 | — | — | 0 | — | — | ○ | — |

INDUSTRIAL APPLICABILITY

The polylactic acid-based resin foamed particles produced by the production method of the present invention demonstrate excellent foaming property and excellent thermal fusion bonding property in in-mold foam-molding. Therefore, a polylactic acid-based resin molded article obtained therefrom is excellent in appearance, heat resistance and mechanical strength, and can be used suitably for applications such as building materials and automotive interior materials.

The invention claimed is:

1. A polylactic acid-based resin foamed particle for in-mold foam-molding which is a polylactic acid-based resin foamed particle obtained by extrusion-foaming, wherein the polylactic acid-based resin contains both optical isomers, a D-form and an L-form, as constituent monomer components, and the content of one of the optical isomers, the D-form or the L-form, whichever is less, being less than 5 mol %, or contains only one of optical isomers, a D-form or an L-form, as a constituent monomer component, and wherein the surface of the particle is entirely covered with a skin layer, and the crystallinity degree is 30% or less.

2. The polylactic acid-based resin foamed particle for in-mold foam-molding according to claim 1, wherein the bulk density is 0.02 to 0.6 g/cm³, the crystallinity degree is 30% or less, and the open cell ratio is 20% or less.

* * * * *